US012715095B2

(12) United States Patent
Yoshikane et al.

(10) Patent No.: US 12,715,095 B2
(45) Date of Patent: Aug. 25, 2026

(54) DRIVING TOOL

(71) Applicant: MAKITA CORPORATION, Anjo (JP)

(72) Inventors: Kiyonobu Yoshikane, Anjo (JP); Tatsuya Ikedo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/951,907

(22) Filed: Nov. 19, 2024

(65) Prior Publication Data

US 2025/0187164 A1 Jun. 12, 2025

(30) Foreign Application Priority Data

Dec. 11, 2023 (JP) ................................ 2023-208457

(51) Int. Cl.
*B25C 1/06* (2006.01)
*B25C 1/00* (2006.01)
*B25C 1/04* (2006.01)

(52) U.S. Cl.
CPC ................ *B25C 1/06* (2013.01); *B25C 1/003* (2013.01); *B25C 1/047* (2013.01)

(58) Field of Classification Search
CPC ......... B25C 1/001; B25C 1/003; B25C 1/047; B25C 1/06
See application file for complete search history.

(56) References Cited

U.S. PATENT DOCUMENTS 11,224,960 B2 1/2022 Garces et al.
11,446,801 B2 * 9/2022 Aizawa .................. B25C 1/047
2005/0202310 A1 * 9/2005 Yahnker .................. B25F 5/008 429/62
2006/0186171 A1 * 8/2006 Porth .................... B25C 5/1627 227/136
2007/0108250 A1 * 5/2007 Odoni ..................... B25C 1/003 227/107
2008/0210734 A1 * 9/2008 Uejima ................... B25C 1/003 227/129
2008/0314953 A1 * 12/2008 Moeller ................ B25C 5/1627 227/109
2009/0114697 A1 * 5/2009 Gross ...................... B25C 1/001 227/120
2011/0180286 A1 * 7/2011 Oomori .................... H02K 9/06 173/217
2011/0303718 A1 * 12/2011 Spasov .................. B25F 5/006 165/287
2014/0021236 A1 * 1/2014 Martel .................... F16B 15/02 227/18

(Continued)

FOREIGN PATENT DOCUMENTS

WO WO-2025047690 A1 * 3/2025 .............. B25C 1/06

*Primary Examiner* — Joshua G Kotis
(74) *Attorney, Agent, or Firm* — Oliff PLC

(57) ABSTRACT

A driving tool includes a driver driven by an electric motor, a driver guide for guiding a movement of the driver, and a magazine for housing driving members. The driving tool also includes a feed pawl for loading the driving members from the magazine to the driver guide, and a power transmission member being interlocking with a movement of the feed pawl. The driving tool also includes a solenoid for moving the feed pawl via the power transmission member. The solenoid is arranged in a main body housing outside of the magazine.

18 Claims, 19 Drawing Sheets

(56) References Cited

U.S. PATENT DOCUMENTS

| | | | | |
|---|---|---|---|---|
| 2019/0022843 | A1* | 1/2019 | Chien | B25C 1/001 |
| 2020/0156231 | A1* | 5/2020 | Ferris | B25C 5/15 |
| 2020/0306941 | A1* | 10/2020 | Akiba | B25C 1/04 |
| 2021/0347022 | A1* | 11/2021 | Leathrum | B25C 1/003 |
| 2022/0161404 | A1* | 5/2022 | Lim | B25C 1/003 |
| 2023/0025226 | A1* | 1/2023 | Aizawa | B25C 1/04 |
| 2023/0137720 | A1* | 5/2023 | Aizawa | B25C 1/047<br>227/129 |
| 2024/0149416 | A1* | 5/2024 | Sutherland | B25C 1/003 |
| 2024/0238955 | A1* | 7/2024 | Hirooka | B25C 1/047 |
| 2024/0408729 | A1* | 12/2024 | Wang | B25C 5/15 |

* cited by examiner

DRIVING TOOL

CROSS-REFERENCE TO RELATED APPLICATION

This application claims priority to Japanese patent application serial number 2023-208457, filed on Dec. 11, 2023, the contents of which are incorporated herein by reference in their entirety for all purposes.

TECHNICAL FIELD

The present invention generally relates to a driving tool for driving a driving member into a workpiece.

BACKGROUND

For example, a driving tool which includes a driver for driving a driving member, a lift mechanism for moving a driver to a standby position and a top dead center, and an electric motor as a driving source of the lift mechanism is well known. A main body housing of the driving tool houses the driver, the lift mechanism, and the electric motor. The driving tool further includes a magazine for housing a plurality of driving members and a feed mechanism for feeding (loading) a driving member from the magazine to a driving passage one by one. The driver is configured to move within the driving passage. The magazine, which is formed in a cylindrical shape, is coupled to a driver guide that forms the driving passage on a lower side of the tool main body. The magazine houses, for example, a plurality of nails that are combined to each other and wound in a spiral manner.

The feed mechanism is arranged, for example, between the magazine and the driver guide outside of the main body housing. The feed mechanism includes a feed pawl for feeding a nail to the driving passage one by one and a check pawl for restricting the nail from returning to the magazine. The feed pawl is constantly biased toward the driving passage by, for example, a compression spring. The feed mechanism has a structure for moving the feed pawl in a direction opposite to a biasing direction of the compression spring. For example, the feed mechanism includes a solenoid. When the solenoid is turned on, the feed pawl moves in a direction opposite to a feeding direction (anti-feeding direction) to receive a next nail. When the solenoid is turned off, the feed pawl moves in the feeding direction together with the next nail. In this manner, a nail is supplied to the driving passage one by one.

In the prior art, the solenoid for feeding a driving member is arranged within the magazine or within a housing between the magazine and the driver guide. When the solenoid is turned on, a large current flows through a coil of the solenoid and accordingly the coil is heated. A fan is attached to the electric motor that is housed in the main body housing so as to be rotatable integrally with an output axis of the electric motor. The fan generates cooling air flow to cool off electric components in the tool main body such as, for example, the electric motor. In the prior art, it used to be difficult to cool off the solenoid by rotation of the fan because the solenoid is arranged outside of the main body housing. Accordingly, there is a room for improving a cooling efficiency to cool off the solenoid.

Furthermore, in the prior art, a plunger of the solenoid needs the same stroke length as a moving distance of the feed pawl in the anti-feeding direction. Therefore, there is a room for shortening a reciprocating time of the plunger. When a stroke length of the plunger is long and a protruding length of the plunger is large, a length of the plunger (iron core) that is inserted to the coil becomes short. Accordingly, when the protruding length of the plunger is large, an output of the solenoid decreases. Therefore, there is a room for maintaining a high output of the solenoid.

Thus, there is a need for the driving tool to efficiently cool off the solenoid that loads a driving member within the magazine to the driving passage.

SUMMARY OF THE DISCLOSURES

According to one aspect of the present disclosure, a driving tool comprises a driver driven by an electric motor, and a driver guide for guiding a movement of the driver, and a magazine for housing a plurality of driving members. The driving tool also comprises a feed pawl for feeding (loading) the plurality of driving members from the magazine to the driver guide one by one, a power transmission member being interlocking with a movement of the feed pawl, and a solenoid configured to move the feed pawl via the power transmission member. The solenoid is arranged in a main body housing outside of the magazine.

Because of this configuration, the solenoid for feeding the driving member within the magazine to the driving passage in the driver guide is arranged in the main body housing. Because of this configuration, the solenoid can be arranged on a flow passage of a cooling air for cooling off, for example, the electric motor. Accordingly, the solenoid can be efficiently cooled off, thereby suppressing a temperature rise of the solenoid. Furthermore, the arrangement of the power transmission member between the solenoid and the feed pawl can efficiently transmit the output of the solenoid to the feed pawl 31.

BRIEF DESCRIPTION OF DRAWINGS

FIG. 8 is an enlarged right side view of the driving tool without the right housing and the driver guide when a solenoid is turned on.

FIG. 11 is an enlarged bottom view of the driving tool without the right housing and the driver guide when the solenoid is turned on.

DETAILED DESCRIPTION

Figure 1:
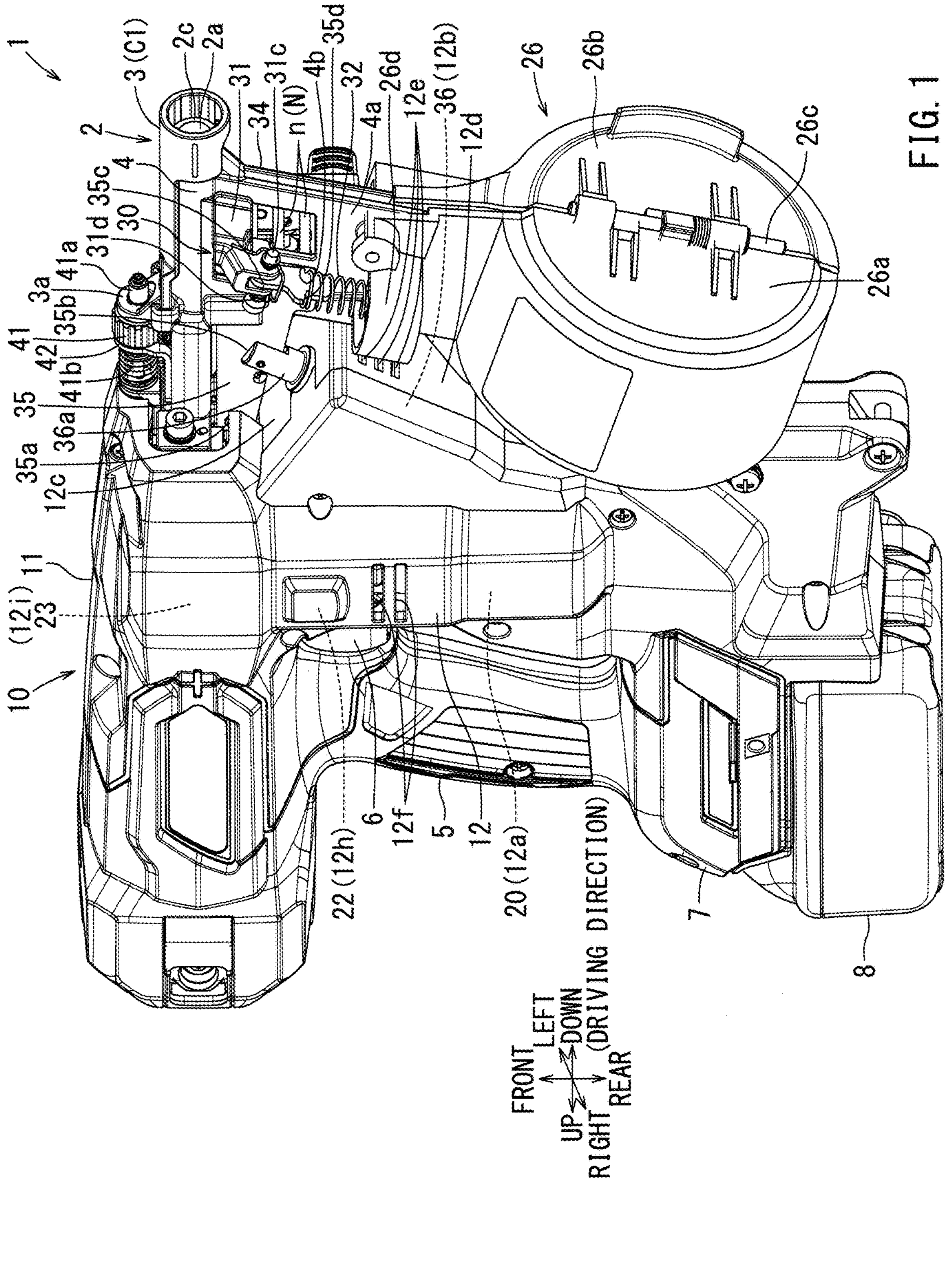
FIG. 1 is a perspective view of a driving tool according to a first embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to one aspect of the present disclosure, the power transmission member is supported by the main body housing such that the power transmission member is rotatable around a rotation support, and the power transmission member is coupled to the feed pawl via a pawl coupling portion. A plunger of the solenoid is connected to the power transmission member between the rotation shaft and the pawl coupling portion. In other words, a part of the power transmission member is arranged between the plunger of the solenoid and the feed pawl. Also, the plunger is coupled to the power transmission member between the rotation support and the pawl coupling portion. Because of this configuration, a short stroke of the plunger can move the feed pawl by utilizing the principle of leverage. Also, a rapid movement of the feed pawl can be obtained. Furthermore, the short stroke of the plunger can make a length of the plunger inserted into the coil to be maintained as long as possible even when the plunger is most protruded (and retracted). Accordingly, the output of the solenoid can be highly maintained.

According to another aspect of the present disclosure, the driving tool further comprises a biasing member for biasing the feed pawl toward the driver guide. The solenoid moves the feed pawl in a direction opposite to a biasing direction of the biasing member when the solenoid is turned on. Accordingly, the feed pawl is constantly biased on a side of the driver guide (in a feeding direction) by the compression spring. The solenoid is turned on only when the next driving member is to be received by the feed pawl. Thus, a driving time of the solenoid is made short and also the driving member can be supplied to the driving passage of the driver guide one by one in a reliable manner.

According to another aspect of the present disclosure, the main body housing includes a motor housing for housing the electric motor, and the solenoid is housed in the motor housing between the electric motor and the magazine. The solenoid and the electric motor are housed in the mechanism case. The solenoid and the electric motor can be cooled off by a cooling mechanism such as, for example, the fan. The magazine is arranged with respect to the main body housing in a position where the driving member is supplied within the driver guide. Accordingly, a space is needed between the electric motor and the magazine. The solenoid can be arranged by utilizing the space, thereby making the driving tool compact.

According to another aspect of the present disclosure, the main body housing includes a fan to generate a cooling air flow through an air passage in the main body housing, and the solenoid is arranged in the air passage. The solenoid is arranged in the air passage in which the air flow generated by the fan flows, thereby efficiently cooling off the solenoid in an improved manner.

According to another aspect of the present disclosure, the solenoid is arranged on an upstream side of the air passage with respect to the electric motor. Accordingly, the cooling air flow cools off the solenoid at first and then the electric motor. A driving time of the electric motor in the driving tool is short because the electric motor is activated only when the driver moves to the standby position or to the top dead center. On the contrary, a quantity of heat generated in the coil is large though the driving time of the solenoid is short. The solenoid, which generates a large quantity of heat, is cooled off at first, thereby efficiently cooling off the electric components including the solenoid and the electric motor in an improved manner.

According to another aspect of the present disclosure, the main body housing includes a motor housing for housing the electric motor. The motor housing includes a motor housing compartment for housing the electric motor and a solenoid housing compartment for housing the solenoid. The motor housing compartment communicates with (connects to) the solenoid housing compartment via a communication passage. Because of this configuration, the air passage can be formed such that the cooling air flow for cooling off the electric motor and the solenoid passes through the communication passage. Accordingly, the cooling air flow can be guided such that the electric motor and the solenoid are efficiently cooled off in an improved manner.

According to another aspect of the present disclosure, the main body housing includes an inlet ports arranged either in a first wall through which a plunger of the solenoid passes or in a second wall facing a coil of the solenoid. In other words, the inlet ports are formed such that the outside air taken from the inlet ports easily flows to the coil of the solenoid, thereby efficiently cooling off the solenoid in an improved manner.

According to another aspect of the present disclosure, the air passage includes a first air passage for the cooling air flow passing through to cool off outside of the electric motor and a second air passage for the cooling air flow passing through to cool off inside of the electric motor. The first air passage communicates with the second air passage. Accordingly, the electric motor is cooled off both from the outside and the inside, thereby efficiently cooling the electric motor.

According to another aspect of the present disclosure, the driving tool further comprises a piston connected to the driver, and a cylinder configured such that the piston is movable within the cylinder. A pressure of a gas in the cylinder increases by a movement of the driver in a direction opposite to the driving direction. Accordingly, in the so-called gas-spring type driving tool, the solenoid for feeding the driving member can be arranged in a position where the solenoid is efficiently cooled off.

Next, a first embodiment of the present disclosure will be explained with reference to FIGS. 1 to 14. As an example of a driving tool 1, a gas-spring type driving tool, which utilizes a pressure of the gas filled in an accumulation chamber as a thrust force for driving a driving member, is exemplified. In the following explanation, a driving direction of the driving member is a downward direction and a direction opposite to the driving direction is an upward direction. A user of the driving tool 1 is generally situated on a right side of the driving tool 1 in FIG. 1. Also, in FIG. 1, a nearer side of the user is referred to as a rearward direction and a direction opposite to the rearward direction is a forward direction. A leftward/rightward direction is based on the user's position.

Figure 2:
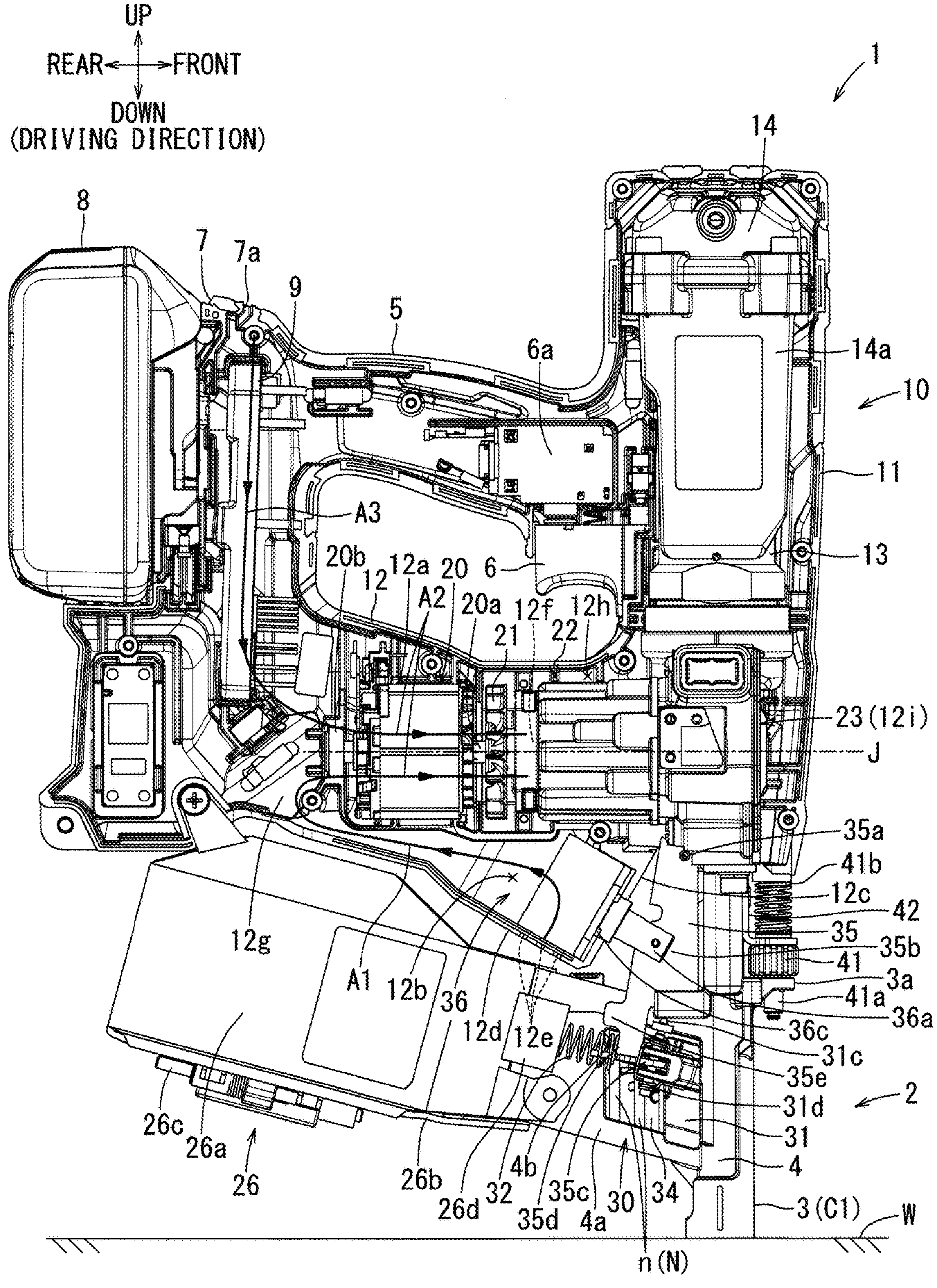
FIG. 2 is a right side view of the driving tool without a right housing.
Figure 3:
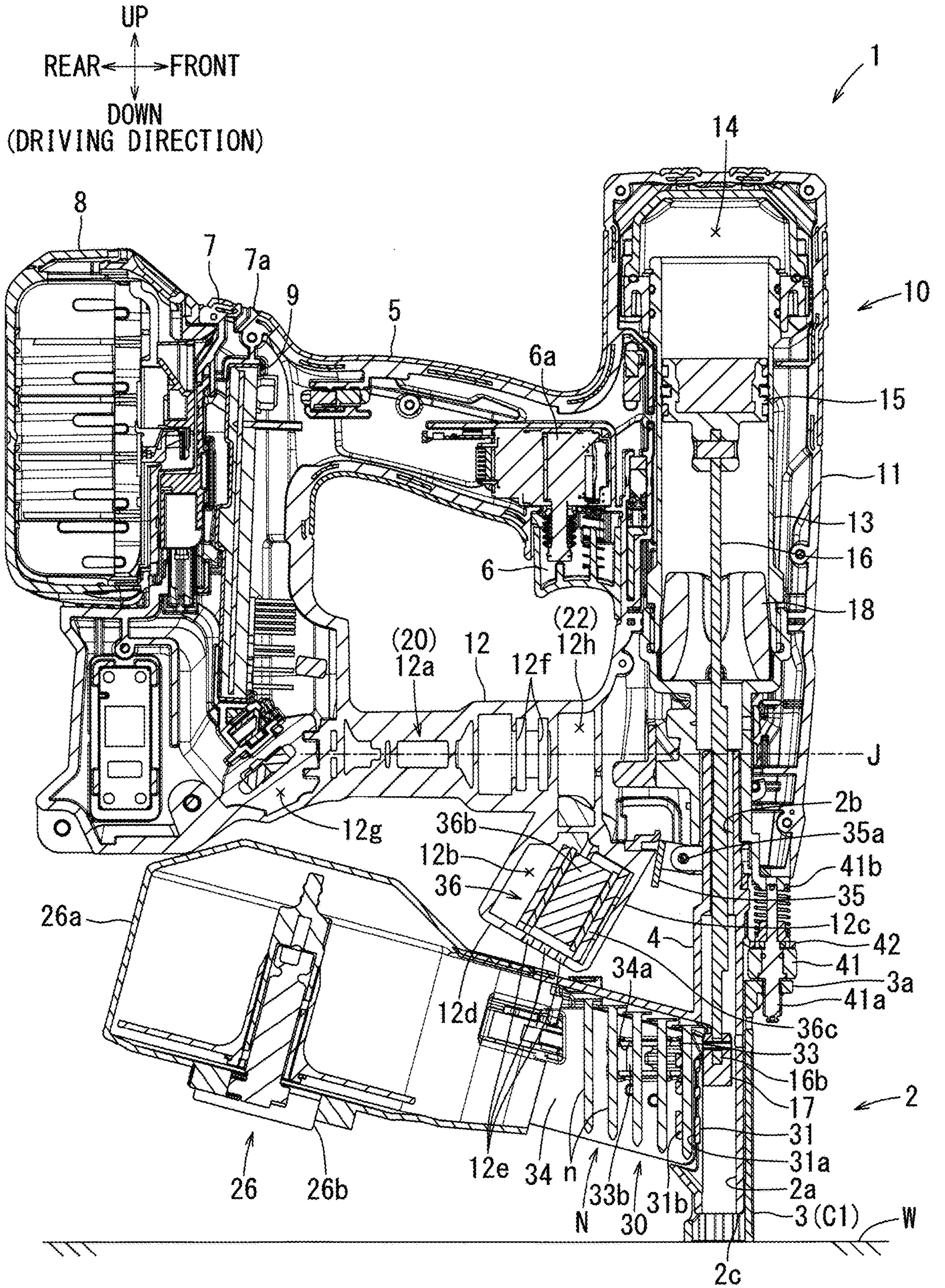
FIG. 3 is a cross-sectional view of the driving tool viewed from the right when a driver is at a standby position.

As shown in FIGS. 2 and 3, the driving tool 1 includes a tool main body 10 and a main body housing 11 for covering the tool main body 10. The main body housing 11 houses a cylinder 13 extending in an up-down direction. The cylinder 13 houses a piston 15 so as to be reciprocated in the up-down direction. An upper end of the cylinder 13 communicates with (connects to) an accumulation chamber 14. A compressed gas such as, for example, an air, is filled in the accumulation chamber 14. The pressure of the gas filled in the accumulation chamber 14 acts as a thrust force for biasing an upper surface of the piston 15 to move in a downward direction.

Figure 5:
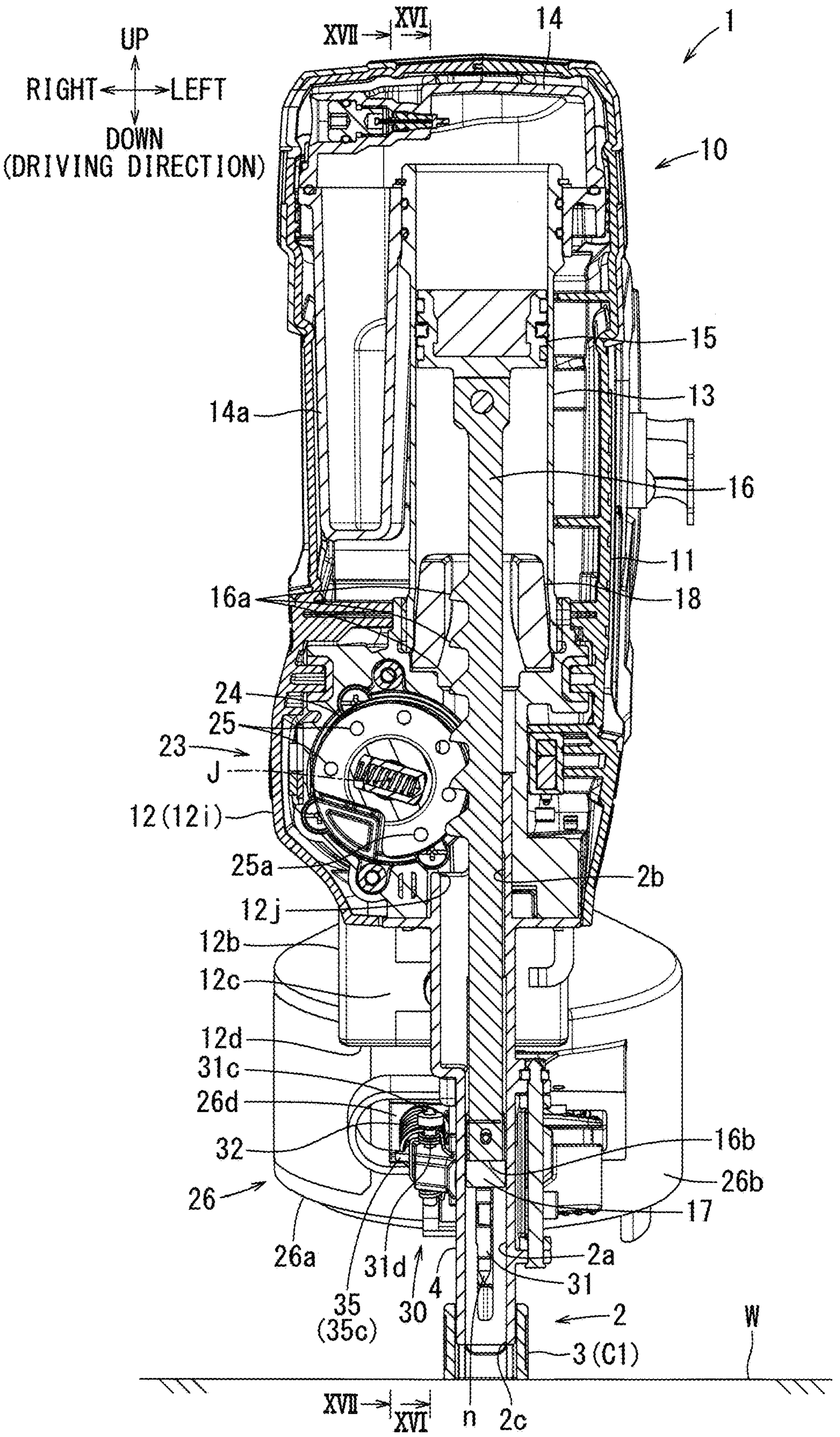
FIG. 5 is a longitudinal cross-sectional view of a tool main body when the driver is at the standby position.
Figure 6:
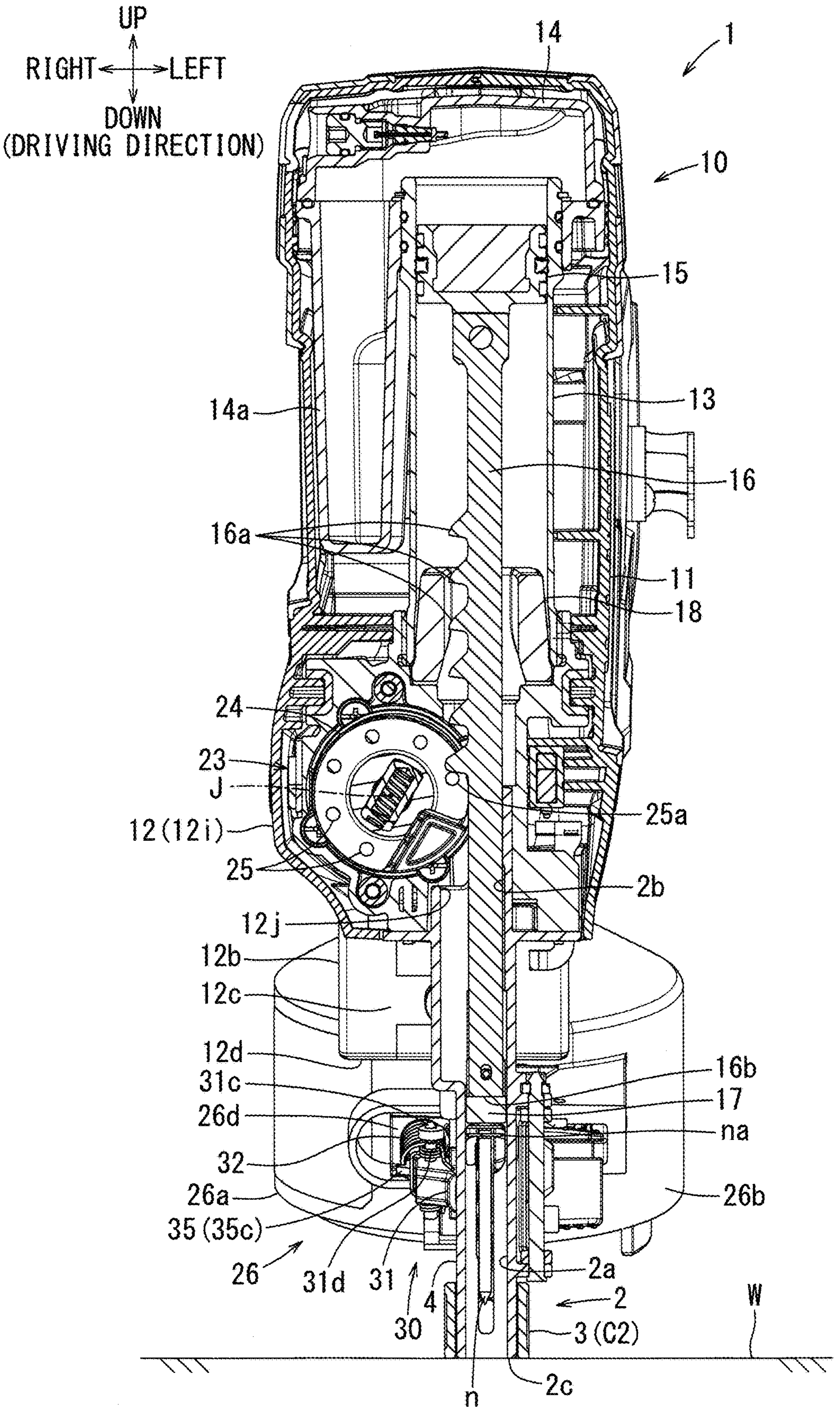
FIG. 6 is a longitudinal cross-sectional view of the tool main body when a driving member is supplied to a driving passage.

As shown in FIGS. 5 and 6, a right portion of the accumulation chamber 14 communicates with (connects to) an air chamber 14*a* which extends downward along a right side surface of the cylinder 13. The air chamber 14*a* is mainly arranged above a lift mechanism 23, overlapping with a part of the lift mechanism 23 in a left-right direction. The lift mechanism 23 is discussed later in detail. By arranging the air chamber 14*a* on the right side of the cylinder 13, a capacity of the accumulation chamber 14 including the air chamber 14*a* increases without enlarging the tool main body 10 in the up-down direction.

As shown in FIGS. 1 to 6, a driving nose 2 is arranged at a lower portion of the tool main body 10. The driving nose 2 includes a driver guide 4 extending in the up-down direction. Driving passages 2*a* and 2*b* extending in the up-down direction are arranged inside of the driver guide 4. An upper-side driving passage 2*b* is connected to a lower-side driving passage 2*a* with each other. The upper-side driving passage 2*b* is formed in approximately a rectangular parallelopiped shape and in a size to insert the driver 16 in the up-down direction. An upper end of the upper-side driving passage 2*b* communicates with a lower portion of the cylinder 13. The lower-side driving passage 2*a* is formed in approximately a cylindrical shape such that a circumference of the lower-side driving passage 2*a* is wider than that of the upper-side driving passage 2*b*. A diameter of the lower-side driving passage 2*a* is approximately the same as or slightly larger than a striker 17 that is formed in approximately a cylindrical shape and attached to a tip end (lower end) 16*b* of the driver 16. A lower end of the lower-side driving passage 2*a* opens downward and acts as an ejection port 2*c*.

As shown in FIGS. 2 to 6, the driving nose 2 includes a contact arm 3 contactable to a workpiece W. The contact arm 3 is movable in the up-down direction between a lower position C1 and an upper position C2 relating to the driver guide 4. The contact arm 3 is biased toward the lower position C1 by a compression spring 41*b* disposed at a front portion of the tool main body 10. When the tool main body 10 approaches the workpiece W with the lower end of the contact arm 3 contacting the workpiece W, the contact arm 3 is pushed by to workpiece W to move from the lower position C1 to the upper position C2. At the upper position C2, the lower end of the contact arm 3 is disposed at approximately the same position as the ejection port 2*c*.

As shown in FIGS. 5 and 6, the lower end of the driver 16 enters the driving passages 2*a*, 2*b*. The driver 16 moves downward by an active gas pressure applied to the upper surface of the piston 15. When the striker 17 attached to the tip end 16*b* of the driver 16 moves to a driving position, the striker 17 drives a head na of a driving member n supplied to the driving passage 2*a*. The driving member n is driven by the striker 17 to move downward within the driving passage 2*a* and ejected from the ejection port 2*c*. The ejected driving member n is driven into the workpiece W. An approximately tubular-shaped damper 18 is arranged within the cylinder 13 on a lower side thereof so as to absorb an impact at a dead center of the piston 15.

As shown in FIGS. 5 and 6, a plurality of rack teeth (engaged portions) 16*a* protruding rightward are arranged on a right side of the driver 16. In the first embodiment, six rack teeth 16*a* are arranged in a longitudinal direction of the driver 16 (in the up-down direction). Each of the plurality of rack teeth 16*a* is formed in approximately a triangle shape such that a bottom portion of each of the rack teeth 16*a* is directed downward (driving direction) when viewed from the front. The bottom portion of each of the rack teeth 16*a* engages a corresponding engaging portion 25 of the lift mechanism 23.

As shown in FIGS. 1 to 4, a grip 5 extending rearward for a user to hold is arranged on a rear side of the tool main body 10. A trigger 6 for a user to pull by his/her finger is arranged on a lower surface of the front portion of the grip 5. A trigger switch 6*a* turns on or off via the trigger 6 and locates in the grip 5. When the driving nose 2 is pushed by the workpiece W to move from the lower position C1 to the upper position C2 (refer to FIG. 6), the trigger 6 is active.

As shown in FIGS. 1 to 4, a battery attachment portion 7 extending in the up-down direction is arranged on a rear side surface of the grip 5. A battery 8 is removably attachable to the battery attachment portion 7. The battery 8 removed from the battery attachment portion 7 can be recharged by a dedicated charger for repeated use. The battery 8 can be used as a power source for other electric power tools. The battery 8 supplies power to an electric motor 20 etc.

Figure 4:
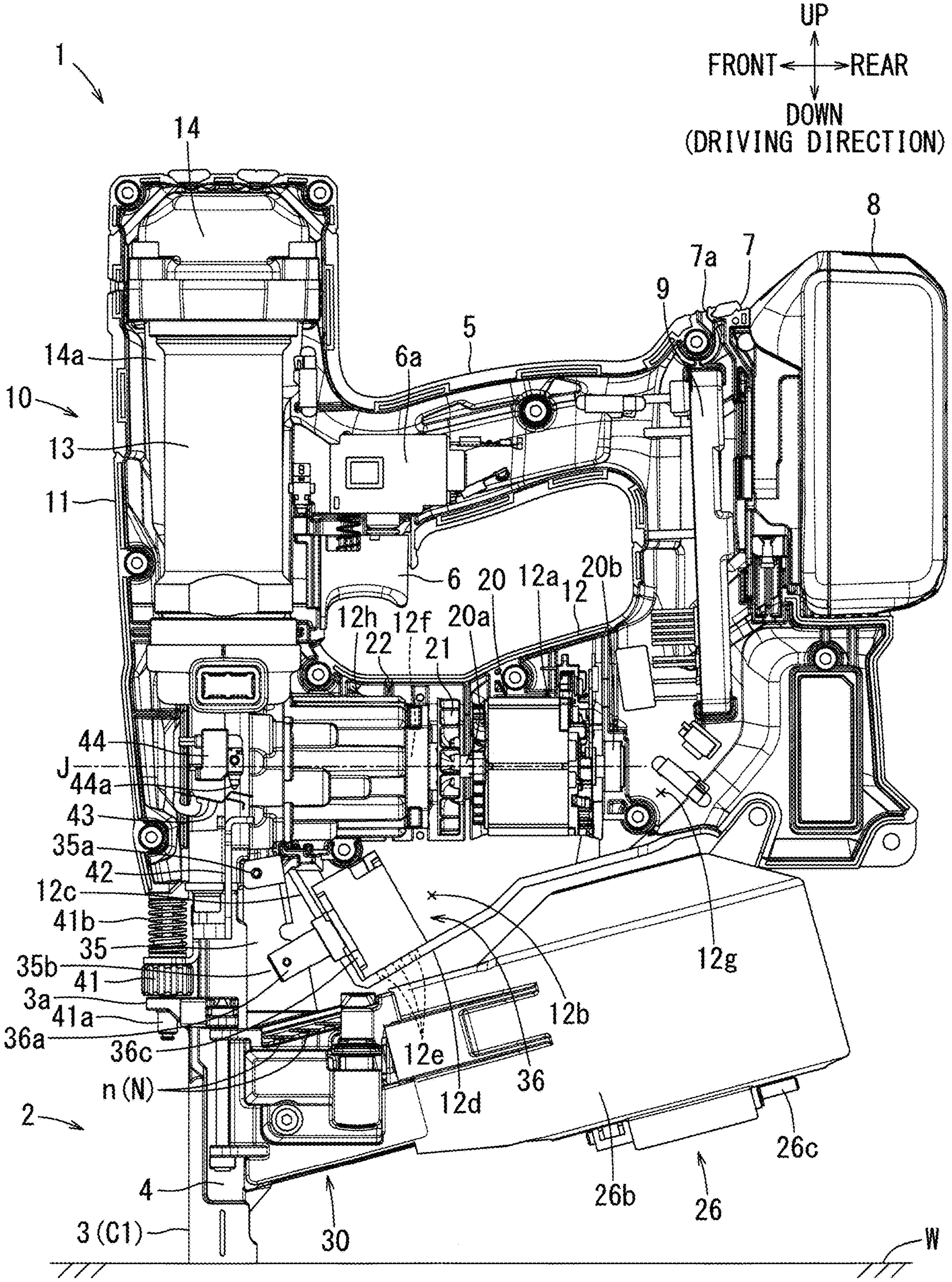
FIG. 4 is a left side view of the driving tool without a left housing.

As shown in FIGS. 2 to 4, a controller 9 for mainly controlling the electric motor 20 is housed in the battery attachment portion 7. The controller 9 includes a shallow box-shaped rectangular case that housed a control circuit board. The controller 9 is arranged in front of the battery 8 attached to the battery attachment portion 7 such that the longest side of the controller 9 extends approximately in the up-down direction and the shortest side in the front-rear direction. An inlet port 7*a* is arranged above the controller 9 and on an upper surface of the battery attachment portion 7. The inlet port 7*a* passes through between the inside and the outside of the battery attachment portion 7.

As shown in FIGS. 1 to 4, the main body housing 11 includes an approximately tubular-shaped mechanism case (motor housing) 12 extending in the front-rear direction below the grip 5. A rear portion of the mechanism case (motor housing) 12 is combined with a lower portion of the battery attachment portion 7. A motor housing compartment 12*a* for housing the electric motor 20 is arranged at a rear portion of the mechanism case (motor housing) 12. A gear housing compartment 12*h* for housing a planetary gear reduction mechanism 22 is arranged in front of the motor housing compartment 12*a*. Exhaust ports 12*f* are arranged on both left and right sides of the gear housing compartment 12*h* such that the exhaust ports 12*f* pass through the inside and the outside of the gear housing compartment 12*h*. A lifter housing compartment 12*i* for housing the lift mechanism 23 is arranged in front of the gear housing compartment 12*h*. The motor housing compartment 12*a*, the gear housing compartment 12*h*, and the lifter housing compartment 12*i* are arranged in a direction of an output axis line J that extends in the front-rear direction. The grip 5, the battery attachment portion 7, and the mechanism case 12 cooperate with each other to form a loop shape.

As shown in FIGS. 2 to 4, the mechanism case (motor housing) 12 includes a solenoid housing compartment 12*b* below the motor housing compartment 12*a* and the gear housing compartment 12*h*. The solenoid housing compartment 12*b* houses a solenoid 36 that is discussed later. The solenoid housing compartment 12*b* is partitioned in the up-down direction by a lower surface of the motor housing compartment 12*a* and a lower surface of the gear housing compartment 12*h* with respect to the motor housing compartment 12*a* and the gear housing compartment 12*h*. A rear portion of the solenoid housing compartment 12*b* and a lower portion of the battery attachment portion 7 communicate with (connects to) the motor housing compartment 12*a* through a communication passage 12*g* that is arranged at a rear portion of the motor housing compartment 12*a*. The motor housing compartment 12*a* communicates with (connects to) the gear housing compartment 12*h* in the front-rear direction.

As shown in FIGS. 1 to 4, the solenoid housing compartment 12*b* is formed in approximately a rectangular box shape. A solenoid 36 is housed at a front portion of the solenoid housing compartment 12*b*. A plunger 36*a* of the solenoid 36 is tilted downward relating to the output axis line J as it extends in a forward direction. The solenoid housing compartment 12*b* includes a front-side first wall 12*c* and a lower-side second wall 12*d*. The first wall 12*c* faces the driving nose 2 and the second wall 12*d* faces the magazine 26. The plunger 36*a* protrudes from a center of the first wall 12*c* to the outside of the solenoid housing compartment 12*b*. The second wall 12*d* includes inlet ports 12*e* passing through the inside and the outside of the solenoid housing compartment 12*b*. The inlet ports 12*e* and the solenoid 36 are arranged so as to be aligned in the up-down direction. A detailed configuration of the solenoid 36 will be discussed later.

As shown in FIGS. 2 and 3, the electric motor 20 includes an output shaft 20*a* extending in the front-rear direction along the output axis line J. A rear portion of the output shaft 20*a* is rotatably supported by a bearing 20*b*. A front portion of the output shaft 20*a* is rotatably supported by a bearing (not shown) disposed in the planetary gear reduction mechanism 22. A fan 21 is attached to a front end of the output shaft 20*a* and behind the planetary gear reduction mechanism 22. By rotation of the fan 21 integrally with the output shaft 20*a*, a cooling air flows into the motor housing compartment 12*a* from the rear to the front. The planetary gear reduction mechanism 22 includes a three-staged planetary gear train. A rotation power of the output shaft 20*a* of the electric motor 20 is reduced by the planetary gear reduction mechanism 22 to be transmitted to the lift mechanism 23.

As shown in FIGS. 5 and 6, the lift mechanism 23 is arranged on a right side of the driving nose 2. The lift mechanism 23 moves the driver 16 and the piston 15 against the pressure of the gas filled in the accumulation chamber 14. The lift mechanism 23 includes a wheel 24 rotatable around the output axis line J. The wheel 24 is configured to be rotatable counterclockwise and to be restricted from rotating clockwise when viewed from the front. A plurality of engaging portions 25 are arranged along an outer circumferential edge of the wheel 24. In the first embodiment, for example, six engaging portions 25 are arranged at equal intervals in a circumferential direction of the wheel 24. For example, a cylindrical-shaped pin extending in the front-rear direction is used for each of the engaging portions 25. When the wheel 24 rotates, each of the engaging portion 25 moves (rotates) around the output axis line J.

As shown in FIGS. 5 and 6, a left portion of the wheel 24 enters the driving passage 2*b* of the driver guide 4 via a window 12*j* arranged on the left side of the lifter housing compartment 12*i*. Each of the engaging portions 25 of the wheel 24 engages a corresponding bottom portion of the rack tooth 16*a* of the driver 16 within the driving passage 2*b*. When the wheel 24 rotates counterclockwise when viewed from the front with at least one of the engaging portions 25 engaging a corresponding bottom portion of the rack tooth 16*a*, the driver 16 and the piston 15 move upward. The upward movement of the piston 15 increases a pressure of the gas filled in the accumulation chamber 14.

As shown in FIG. 4, a dial-type adjuster 41 is arranged in front of the driving nose 2. The adjuster 41 includes a rotation shaft 41*a* which extends in the up-down direction. The rotation shaft 41*a* is rotatable and movable in the up-down direction integrally with the adjuster 41. An adjuster coupling member 3*a* coupled to the adjuster 41 is arranged above the contact arm 3. The contact arm 3 is movable in the up-down direction integrally with the adjuster 41. By rotating the adjuster 41 around its axis, a position of the contact arm 3 can be adjusted in the up-down direction. The adjuster 41 includes a compression spring 41*b* that is arranged on an outer circumferential side of the rotation shaft 41*a* and supported by the main body housing 11. The compression spring 41*b* biases the adjuster 41 and the contact arm 3 in the downward direction. Accordingly, the contact arm 3 is normally positioned in the lower position C1.

As shown in FIG. 4, a contact plate 42 is integrally joined to an upper portion of the adjuster 41. A plate-shaped spring 43 and a switch 44 are arranged above the contact plate 42. When the contact arm 3 moves from the lower position C1 to the upper position C2 (refer to FIG. 6), the contact plate 42 moves upward via the adjuster 41. An upper end of the contact plate 42 pushes a protrusion pin 44*a* of the switch 44 via the spring 43. Accordingly, the switch 44 is turned on and transmits an on-signal to the controller 9. When the on-signal is transmitted to the controller 9, a pulling operation of the trigger 6 becomes effective. When the contact arm 3 is at the lower position C1, the contact plate 42 does not move upward and thus the protrusion pin 44*a* of the switch 44 is not pushed. Accordingly, the switch 44 does not transmit the on-signal to the controller 9, and thus, a pulling operation of the trigger 6 does not become effective.

As shown in FIGS. 1 to 4, an approximately cylindrical-shaped magazine 26 is arranged behind the driving nose 2. The magazine 26 is arranged such that an axial direction thereof is directed approximately in the up-down direction. The magazine 26 has a half-split structure including a right portion 26*a* and a left portion 26*b*. A support shaft 26*c* is arranged between a left end of the lower surface of the right portion 26*a* and a right end of the lower surface of the left portion 26*b*. The left portion 26*b* is rotatable around the support shaft 26*c* so as to be opened and closed with respect to the right portion 26*a*. By opening the left portion 26*b*, combined plurality of driving members n can be placed to the magazine 26. By closing the left portion 26*b*, the combined plurality of driving members n can be held in the magazine 26. The driver guide 4 includes a flat-plate-shaped feed guide 4*a* extending rearward from the driving nose 2. A front end of the right portion 26*a* of the magazine 26 is linked to and supported by the feed guide 4*a*. A rear end of the right portion 26*a* of the magazine 26 is linked to and supported by a rear end of the mechanism case (motor housing) 12 of the main body housing 11.

Figure 7:
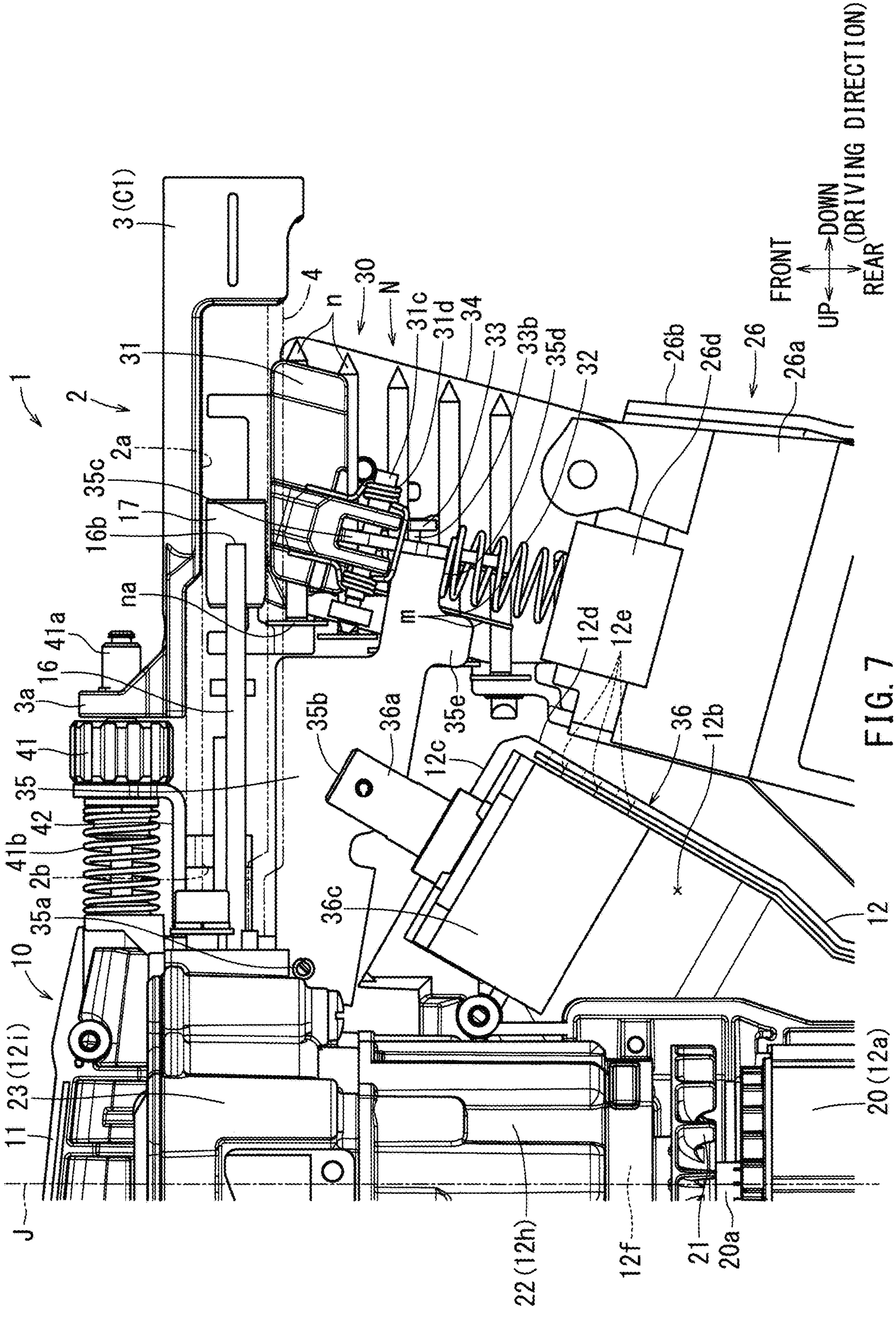
FIG. 7 is an enlarged right side view of the driving tool without the right housing and a driver guide when the driver is at the standby position.
Figure 8:
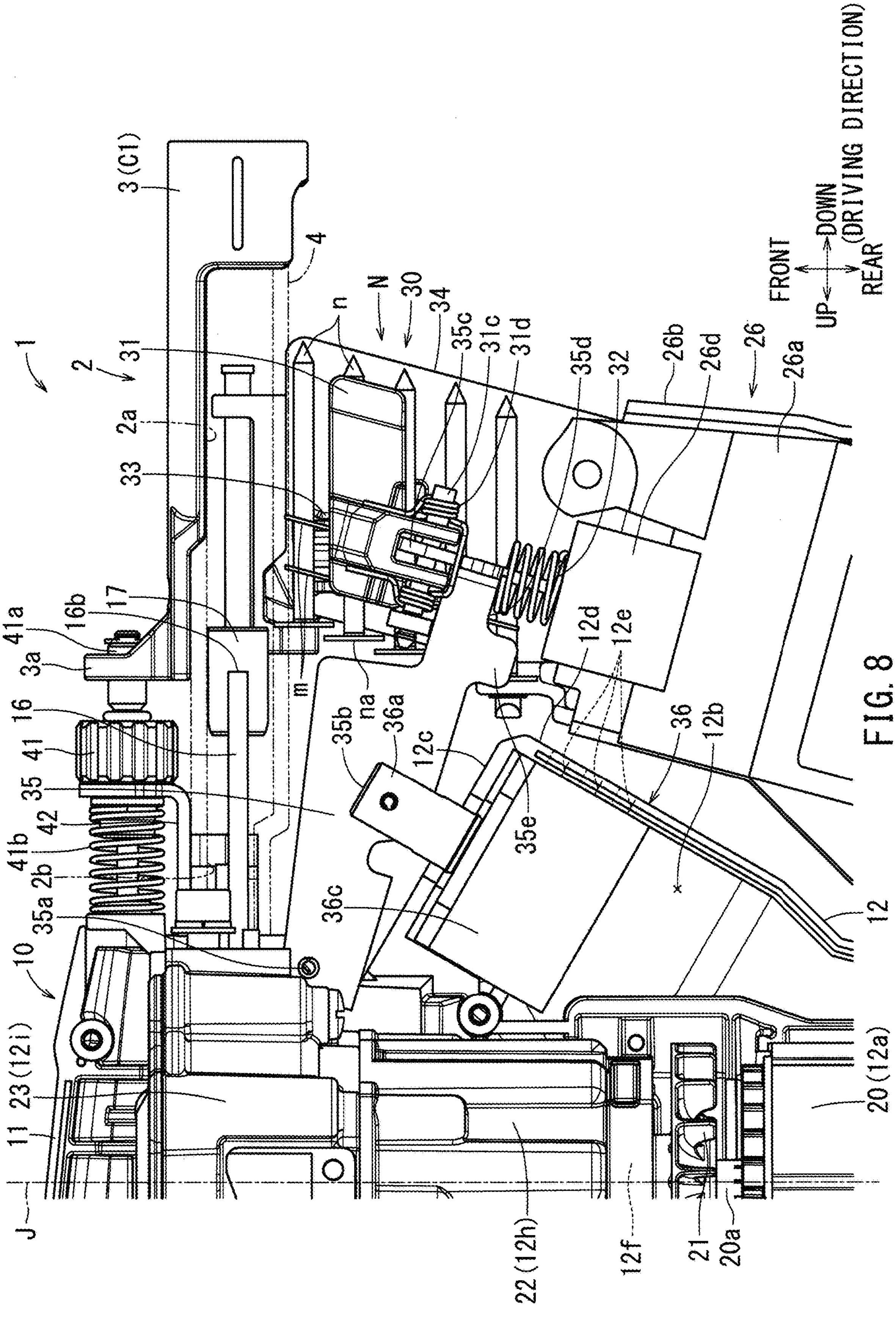
Figure 9:
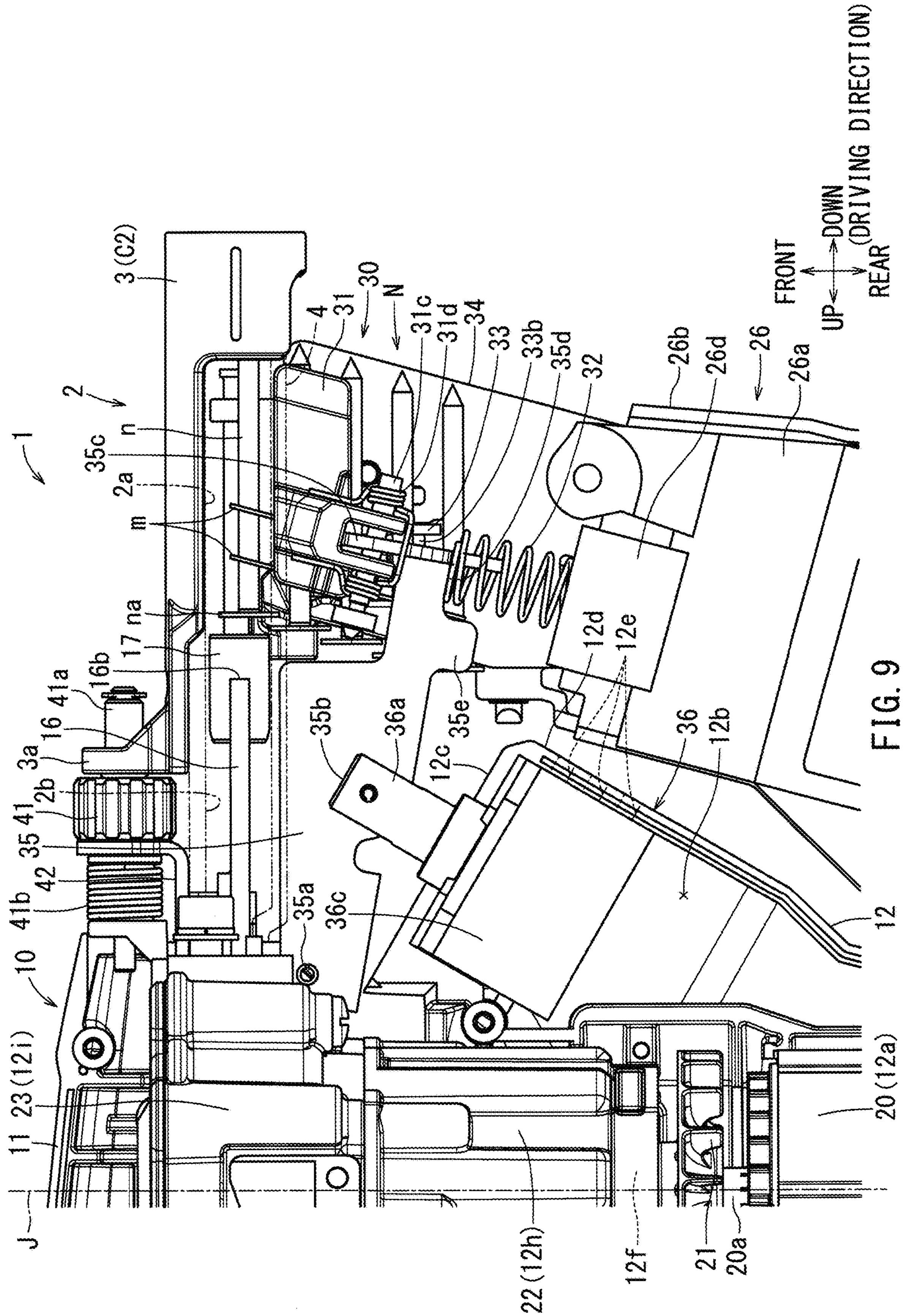
FIG. 9 is an enlarged right side view of the driving tool without the right housing and the driver guide when the driving member is supplied to the driving passage.
Figure 10:
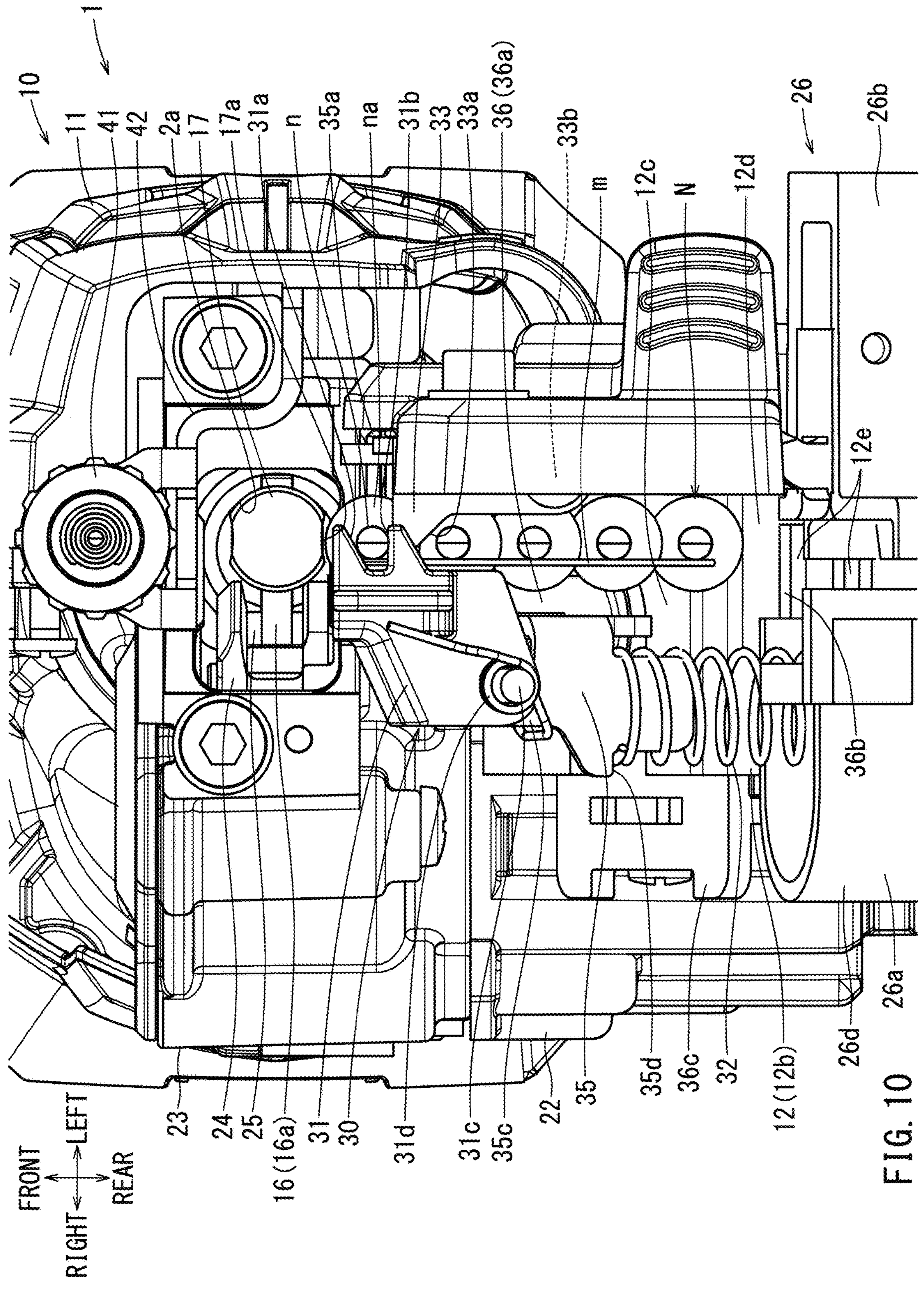
FIG. 10 is an enlarged bottom view of the driving tool without the right housing and the driver guide when the driver is at the standby position.
Figure 11:
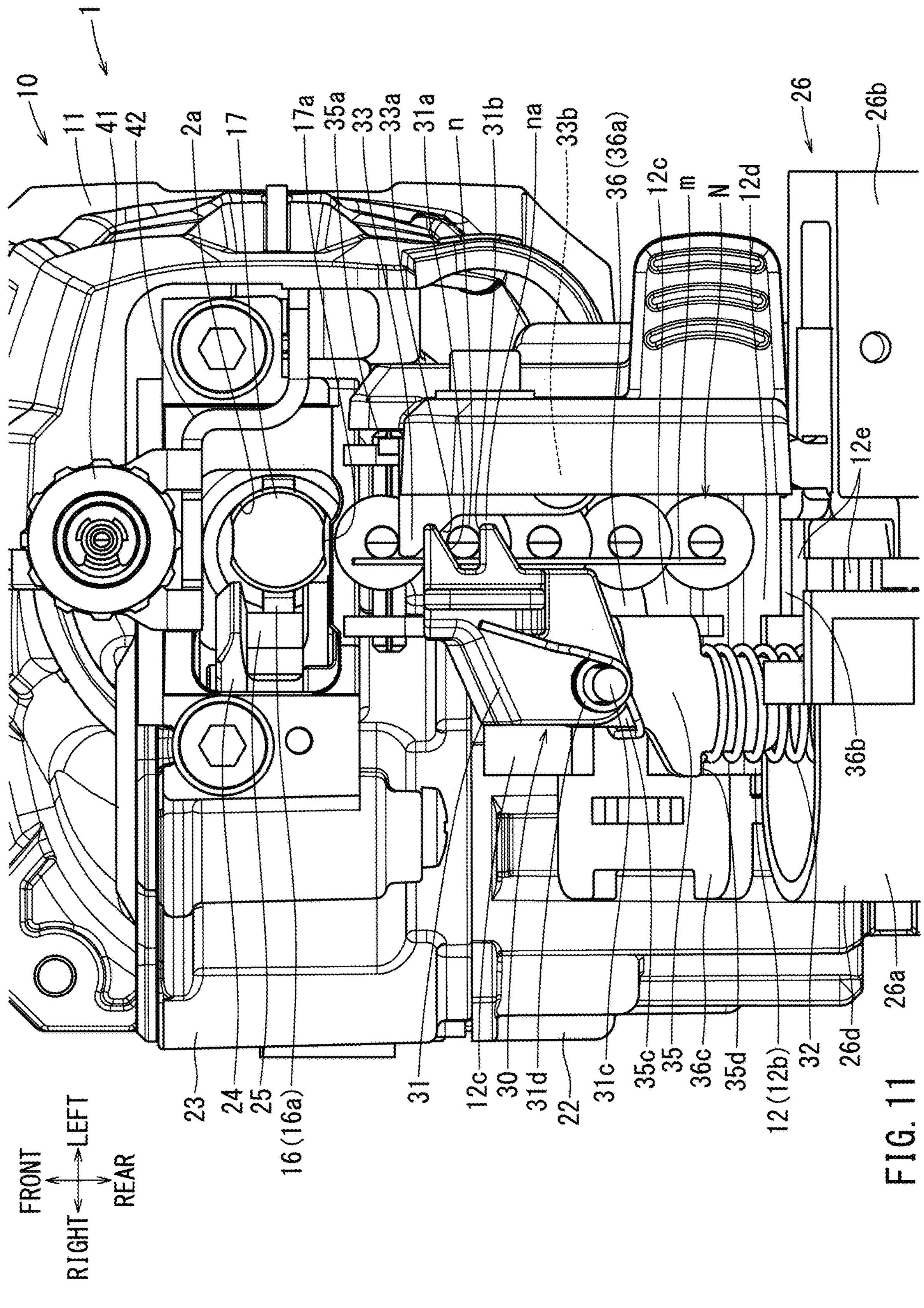

As shown in FIGS. 7 to 9, a combined plurality of driving members N, which are wound in a spiral manner, includes a plurality of driving members n and combining members m for combining each of the plurality of driving members n. Each of the plurality of driving members n is a nail having a circular head na. Each of the combining members m is, for example, a metal-made wire. The combining members m are arranged at specified intervals in a direction approximately perpendicular to a longitudinal direction of the plurality of driving members n so as to combine the plurality of driving members n. The combined plurality of driving members N wound in a spiral manner are housed in the magazine 26. An end of the combined plurality of driving members N is guided from the magazine 26 to the front and held in a feed mechanism 30 arranged between the magazine 26 and the driving nose 2.

As shown in FIGS. 7 to 12, the feed mechanism 30 includes a feed pawl 31 for feeding the driving member n to the driving passage 2*a* in a forward direction. The feed mechanism 30 includes a biasing member 32 for biasing the feed pawl 31 in the forward direction. The biasing member 32 is, for example, a coil-shaped compression spring. A spring receiving portion 26*d* for holding a rear end of the compression spring 32 is arranged at a front portion of the right portion 26*a* of the magazine 26. The feed mechanism 30 includes the solenoid 36 for moving the feed pawl 31. Power is supplied or shut off from the battery 8 to the solenoid 36 according to a signal from the controller 9. When power is shut off from the battery 8 to the solenoid 36 for the solenoid 36 to become an off-state, the feed pawl 31 is biased forward to a side of the driving passage 2*a* by the compression spring 32. On the contrary, when power is supplied from the battery 8 to the solenoid 36 to become an on-state, the feed pawl 21 moves to a side of the magazine against the biasing force of the compression spring 32.

As shown in FIG. 2, the solenoid 36 is housed in the solenoid housing compartment 12*b* in the mechanism case (motor housing) 12 arranged above the magazine 26. In other words, the solenoid 36 is not arranged in the magazine 26 nor in a feed passage of the driving member n between the magazine 26 and the driver guide 4 in the front-rear direction.

As shown in FIGS. 7 to 9, 13, and 14, the solenoid 36 includes a rectangular box-shaped holder 36*c* and the plunger 36*a* protruding from the holder 36*c* in the forward direction. A penetrating hole through which the plunger 36*a* passes is arranged in a front surface of the holder 36*c*. A lower surface and an upper surface of the holder 36*c* are opened. A coil 36*b* is housed in the holder 36*c*. The plunger 36*a* is inserted into the coil 36*b*. The coil 36*b* is arranged in an adjoining area of inlet ports 12*e* on the second wall 12*d* of the solenoid housing compartment 12*b*.

As shown in FIGS. 7 to 9, 13, and 14, the feed mechanism 30 includes a power transmission member 35 that is moved by driving of the solenoid 36. The feed pawl 31 moves in the front-rear direction being interlocking with a movement of the power transmission member 35. The power transmission member 35 is formed in a plate shape extending approximately in the up-down direction. A rotation support 35*a* around which the power transmission member 35 rotates is arranged at an upper portion of the power transmission member 35. The rotation support 35*a* is rotatably supported by the driver guide 4 via a shaft member extending in the left-right direction.

As shown in FIGS. 7 to 9, 13, and 14, a pawl coupling portion 35*c* for coupling with a rear portion of the feed pawl 31 is formed at a lower end of the power transmission member 35. A spring receiving portion 35*d* for receiving a front end of the compression spring 32 is formed on a rear surface of the pawl coupling portion 35*c*. The power transmission member 35 and the feed pawl 31 are biased in the forward direction by the compression spring 32 via the spring receiving portion 35*d*. The power transmission member 35 includes a thick portion 35*e* behind the pawl coupling portion 35*c*. The thick portion 35*e* is formed thicker than the pawl coupling portion 35*c* and extends in the up-down direction. The thick portion 35*e* improves rigidity of the power transmission member 35 against the biasing force of the compression spring 32 and a driving force of the solenoid 36.

As shown in FIGS. 7 to 9, 13, and 14, the power transmission member 35 includes a plunger coupling portion 35*b* for coupling to a front end of the plunger 36*a*. The plunger coupling portion 35*b* is arranged at the middle between the rotation support 35*a* and the pawl coupling portion 35*c* in the up-down direction. For example, a distance between the rotation support 35*a* and the plunger coupling portion 35*b* is approximately half the distance between the rotation support 35*a* and the pawl coupling portion 35*c*. Accordingly, a moving distance of the plunger 36*a* is approximately half of a moving distance of the feed pawl 31.

As shown in FIGS. 10-14, a left end of the feed pawl 31 is formed in approximately a U shape. A tilted surface 31*a* is formed at a front portion of the left end of the feed pawl 31. The tilted surface 31*a* is formed so as to be tilted in the forward direction as it extends in the leftward direction. A portion extending from a right end of the tilted surface 31*a* is directed in the front-rear direction. A receiving surface 31*b* facing the tilted surface 31*a* is formed on a rear left side of the feed pawl 31. The receiving surface 31*b* extends approximately in the left-right direction. A right lower portion of the feed pawl 31 is rotatably connected to the pawl coupling portion 35*c* of the power transmission member 35 via a rotation support shaft 31*c* that extends in the up-down direction. The feed pawl 31 includes a torsion spring 31*d* that biases the feed pawl 31 around the rotation support shaft 31*c*. The torsion spring 31*d* biases the feed pawl 31 clockwise when viewed from the bottom.

As shown in FIGS. 7 to 12, the feed mechanism 30 includes a check pawl 33 for preventing a driving member n, which has fed forward by the feed pawl 31, from returning rearward from the driving passage 2*a*. A tilted surface 33*a* is formed at a front portion of the check pawl 33. The tilted surface 33*a* is formed so as to be tilted in the forward direction as it extends in the rightward direction. A right rear portion of the check pawl 33 extends in the front-rear direction. A plate-shaped guide member 34 extending in the front-rear direction and in the up-down direction is arranged between the driving passage 2*a* and the magazine 26. The guide member 34 is arranged on a left side of the feed guide 4*a* and extends approximately parallel to the feed guide 4*a*. A lower portion of the check pawl 33 is rotatably connected by the guide member 34 via a rotation support shaft 33*b* extending in the up-down direction. The check pawl 33 is biased counterclockwise viewed from the bottom by a spring (not shown in the figures).

As shown in FIG. 1, the feed passage for feeding (loading) a driving member n from the magazine 26 to the driving passage 2*a* is formed between the feed guide 4*a* and the guide member 34 in the left-right direction. The feed pawl 31 is inserted into a hole 4*b* passing through the feed guide 4*a* in the left-right direction and protrudes from right to left toward the feed passage. The check pawl 33 is inserted into a hole 34*a* passing through the feed guide 4*a* in the left-right direction and protrudes from left to right toward the feed passage (refer to FIG. 8).

Figure 12:
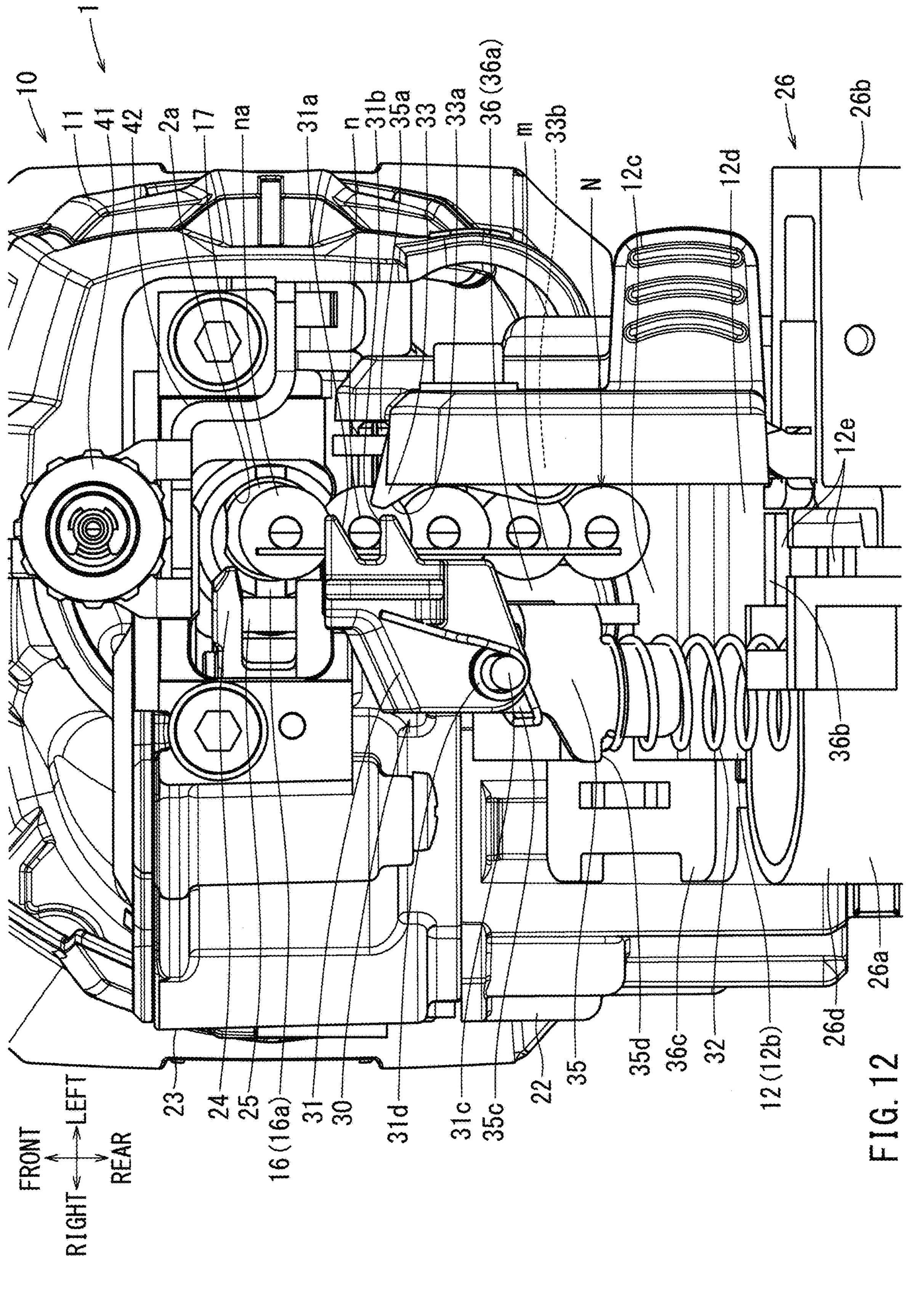
FIG. 12 is an enlarged bottom view of the driving tool without the right housing and the driver guide when the driving member is supplied to the driving passage.
Figure 13:
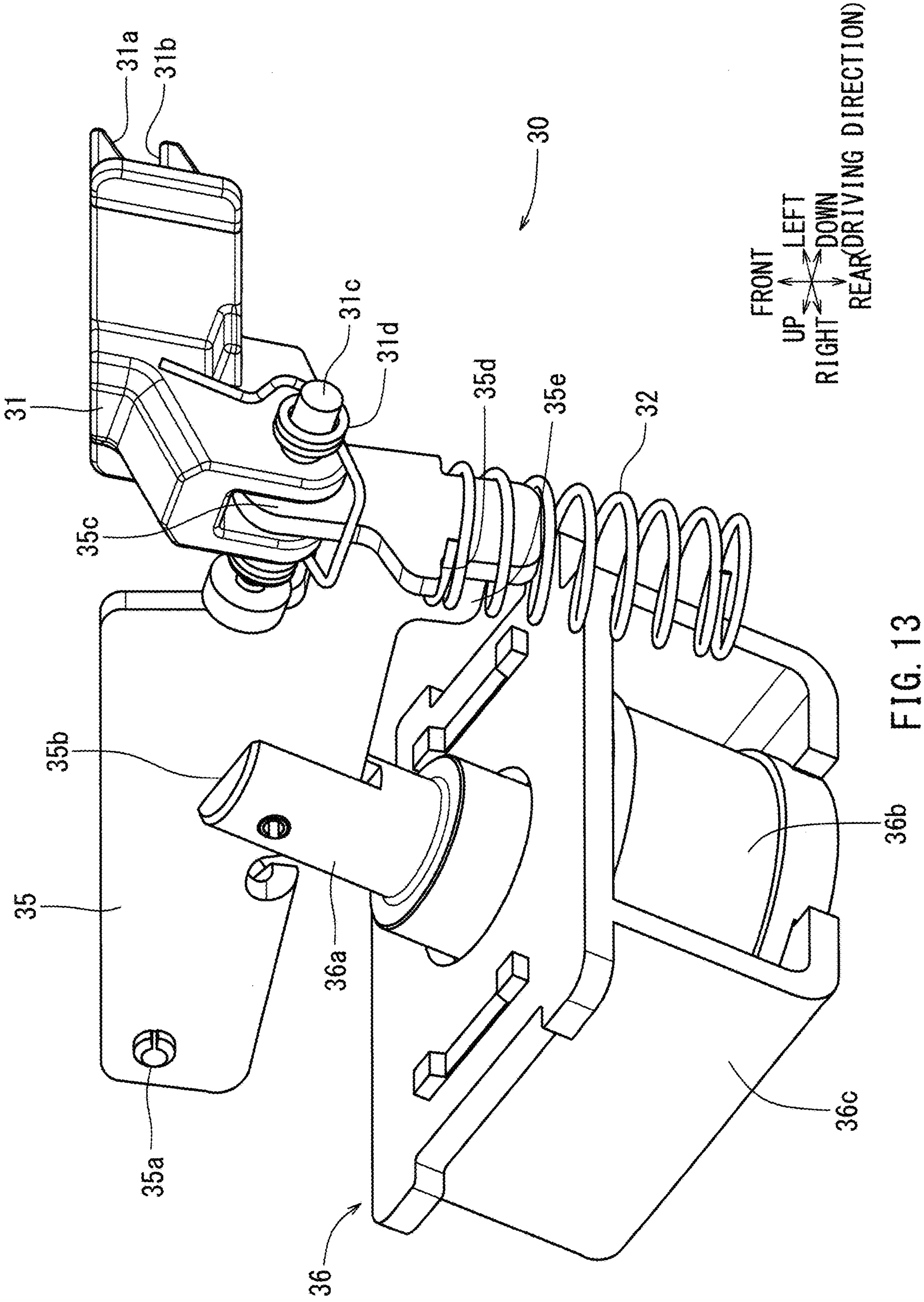
FIG. 13 is a perspective view of the solenoid, a power transmission member, and a feeding claw.
Figure 14:
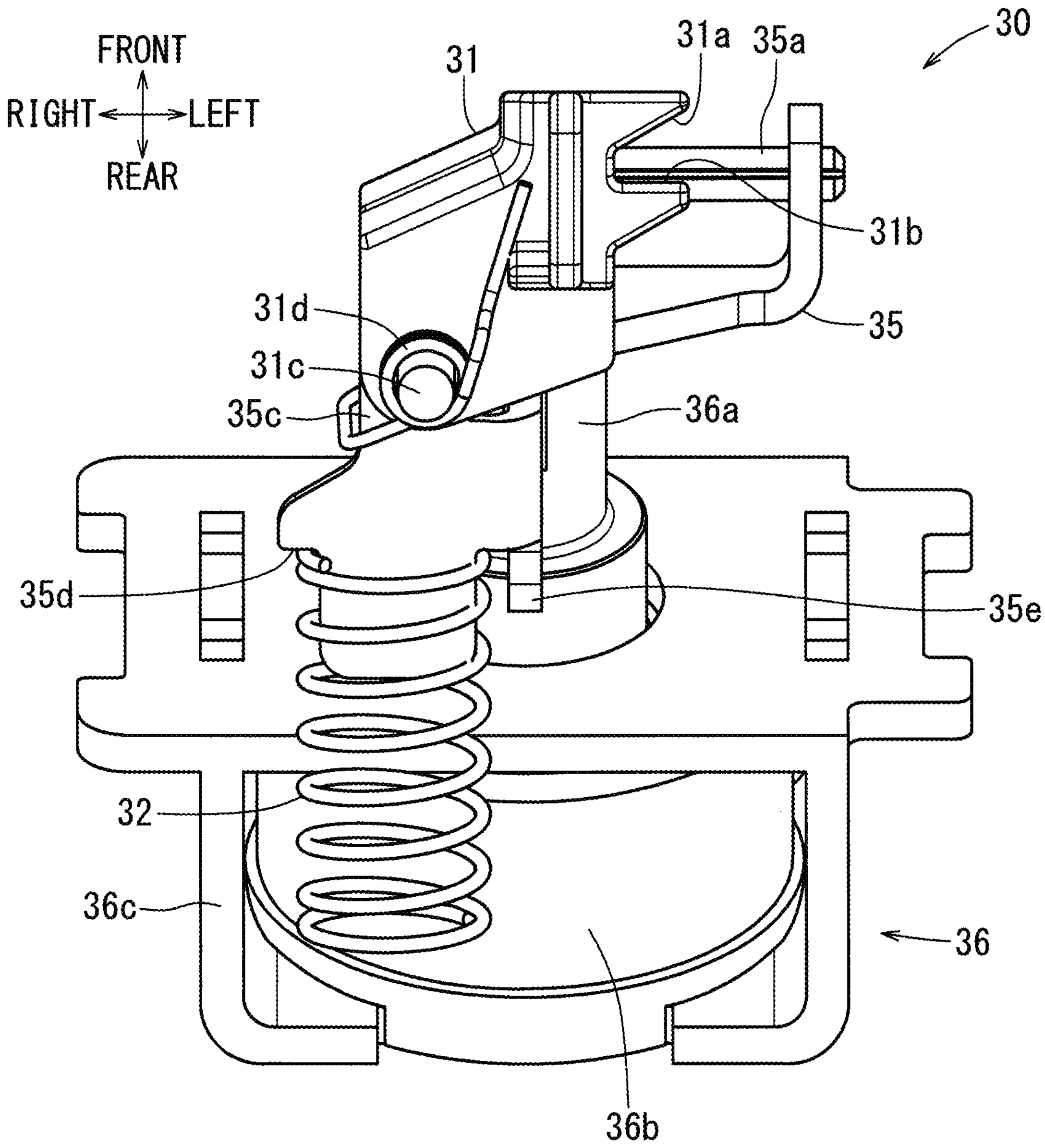
FIG. 14 is a bottom view of the solenoid, the power transmission member, and the feeding claw.

Next, a series of a driving operation of the driving tool 1 will be explained with reference to FIGS. 3 to 12. FIGS. 3, 5, 7, and 10 show that the driver 16 is at the standby position and that a driving member n is not supplied to the driving passage 2*a*. FIGS. 6, 9, and 12 show that a driving member n is supplied to the driving passage 2*a*. The driver 16 at the standby position is slightly below the top dead center. When the driver 16 is at the standby position, a bottom surface of a second rack tooth 16*a* from the bottom engages a preceding engaging portion 25 preceding the last engaging portion 25*a* of the lift mechanism 23 (on a counterclockwise side in FIG. 5).

When the contact arm 3 is pushed by the workpiece W, the contact arm 3 moves from the lower position C1 to the upper position C2. The contact plate 42 connected to the adjuster 41 is moved upward in conjunction with the contact arm 3. When the contact plate 42 moves upward, the protrusion pin 44*a* of the switch 44 is pushed via the spring 43. When the switch 44 is tuned on, the switch 44 transmits an on-signal to the controller 9. When the controller 9 receives the on-signal from the switch 44 and the trigger 6 is pulled from the user, the controller 9 activates the electric motor 20. When the electric motor 20 is activated, the wheel 24 of the lift mechanism 23 starts to rotate. Accordingly, the rack teeth 26*a* engaging the engaging portions 25 move upward and the driver 16 moves upward from the standby position to the top dead center.

When the driver 16 moves from the standby position to the top dead center, a foremost driving member n is supplied to the driving passage 2*a* by the feed mechanism 30. Immediately before the lower end of the striker 17 attached to the tip end 16*b* of the driver 16 moves upward beyond a head na of the driving member n (refer to FIG. 8), power is supplied to the solenoid 36. The plunger 36*a* moves rearward together with the plunger coupling portion 35*b* of the power transmission member 35. The power transmission member 35 rotates rearward around the rotation support 35*a*. The feed pawl 31 moves rearward against the biasing force of the compression spring 32 being interlocking with the rearward movement of the pawl coupling portion 35*c* of the power transmission member 35.

When the feed pawl 31 moves rearward, the tilted surface 31*a* of the feed pawl 31 is pushed by the driving member n. Accordingly, the feed pawl 31 moves (retreats) rightward so as to be apart from the driving member n against the biasing force of the torsion spring 31*d*. When the plunger 36*a* moves to the rearmost end, the feed pawl 31 rotates leftward to a position where the next driving member n is placed by the biasing force of the torsion spring 31*d*. Accordingly, the next driving member n is held by the tilted surface 31*a* and the receiving surface 31*b* of the feed pawl 31. The driving member n at the foremost end is positioned immediately behind the striker 17 and held so as not to be moved rearward by the front surface of the check pawl 33.

When the lower end of the striker 17 moves above the head na of the driving member n (refer to FIG. 9), power to the solenoid 36 is shut off. Accordingly, the power transmission member 35 rotates forward around the rotation support 35*a* by the biasing force of the compression spring 32. The feed pawl 31 moves forward while holding the second driving member n from the front. The check pawl 33 is pushed by the driving member n that moves from the rear to the front and accordingly the check pawl 33 moves (retreats) leftward so as to be apart from the driving member n against the biasing force of the spring (not shown). Because of this configuration, the feed pawl 31 smoothly moves the combined plurality of driving members N, including the driving member n which is being held, in the forward direction. When the combined plurality of driving members N moves in the forward direction, the driving member n at the foremost end is supplied to the driving passage 2*a* during the time while the driver 16 moves from the standby position to the top dead center. By the biasing force of the spring (not shown), the check pawl 33 rotates rightward to a position where the driving member n is disposed. Accordingly, the combined plurality of driving members N are restricted from moving (returning) rearward on a side of the magazine 26.

When the driver 16 moves upward to the top dead center before driving the driving member n, the last engaging portion 25*a* of the wheel 24 disengages from the bottom portion of the lowermost rack tooth 16*a*. The driver 16 moves downward owing to the active pressure of the gas filled in the accumulation chamber 14, which is applied to the piston 15. The striker 17 drives the head na of the driving member n within the driving passage 2*a*. The driving member n that is driven by the striker 17 is ejected from the ejection port 2*c* to the workpiece W. The ejected driving member n is separated (sheared) from the combined plurality of driving members N by an impact of the striker 17 (the driver 16). While the driver 16 moves downward, all of the engaging portions 25 of the wheel 24 move (retreat) rightward of the driving passage 2*b*. Accordingly, the plurality of rack teeth 16*a* of the driver 16 moving downward can be prevented from interfering with the engaging portions 25 of the wheel 24, thereby smoothly performing a driving operation.

While the driver 16 moves downward and after the driver 16 reaches a bottom dead center, the wheel 24 continues to rotate. When the driver 16 is at the bottom dead center and the wheel 24 rotates by a predetermined rotation angle, one of the engaging portion 25 of the wheel 24 engages a bottom surface of the uppermost rack tooth 16*a* of the driver 16. Accordingly, the driver 16 starts to move upward (a rerunning movement of the driver 16 starts). The driving member n next to the ejected driving member n is held between the tilted surface 31*a* and the receiving surface 31*b* and on the front surface of the check pawl 33. The next driving member n is positioned immediately behind the driving passage 2*a*. The striker 17 includes an ark-shaped surface 17*a*, which is formed in a complementary shape with the head na of the driving member n, at the rear surface thereof. The striker 17 can be prevented from interfering with the head na of the next driving member n by the ark-shaped surface 17*a*.

Accordingly, the next driving member n is held in an adjoining area of the driving passage 2*a* as close as possible.

When the wheel 24 rotates and a preceding engaging portion 25 preceding to the last engaging portion 25*a* engages a bottom of the second rack tooth 16*a* from the bottom, the driver 16 returns to the standby position. When the driver 16 (and the piston 15) returns to the standby position, the electric motor 20 is stopped by, for example, adequately measuring of a time from a activation time of the electric motor 20 or rotation position of the wheel 24. Accordingly, the driver 16 is held at the standby position. As described above, a series of driving operation is completed.

Next, a cooling air flow flowing in the main body housing 11 will be explained with reference to FIG. 2. When the electric motor 20 is activated, the fan 21 rotates integrally with the output shaft 20*a*. Accordingly, a cooling air flow flowing from the rear to the front in the motor housing compartment 12*a* of the mechanism case 12 is generated. A negative pressure is generated inside of the solenoid housing compartment 12*b*, which communicates with the motor housing compartment 12*a* via the communication passage 12*g*, and the battery attachment portion 7, thereby flowing the cooling air inside of the solenoid housing compartment 12*b* and the battery attachment portion 7.

An outside air as the cooling air is taken into the solenoid housing compartment 12*b* from the inlet ports 12*e* of the second wall 12*d* at first. The cooling air flows in an air passage A1, passing through between the coil 36*b* of the solenoid 36*b* (refer to FIG. 13) and an inner circumferential surface of the holder 36*c*, and flowing rearward to the communication passage 12*g*. The cooling air flowing in the air passage A1 cools off the coil 36*b*. After that, the cooling air flows through an air passage A2 from the communication passage 12*g* to the motor housing compartment 12*a* in the forward direction. The cooling air flowing in the air passage A2 cools off the electric motor 20. The cooling air is discharged to the outside from the exhaust ports 12*f* in the gear housing compartment 12*h* in front of the motor housing compartment 12*a*.

Furthermore, an outside air is taken, as the cooling air, into the battery attachment portion 7 from the inlet ports 7*a* on an upper side of the battery attachment portion 7. The cooling air flows in an air passage A3, passing in a adjoining area of the controller 9, and flowing downward to the communication passage 12*g*. The cooling air flowing in the air passage A3 cools off the controller 9. The cooling air flowing in the air passage A3 merges with the cooling air flowing in the air passage A2 in the communication passage 12*g*. The cooling air is discharged to the outside from the exhaust ports 12*f* in the gear housing compartment 12*h*.

As described above, the driving tool 1 includes the driver 20 configured to move in the driving direction and driven by the electric motor 20, as shown in FIGS. 7 to 9. The driving tool 1 includes the driver guide 4 for guiding the driver 16. The driving tool 1 includes the magazine 26 for housing the plurality of driving members n. The driving tool 1 includes the feed pawl 31 for feeding (loading) the driving member n from the magazine 26 to the driver guide 4. The driving tool 1 includes the power transmission member 35 being interlocking with the feed pawl 31. The driving tool 1 includes the solenoid 36 that is configured to move the feed pawl 31 via the power transmission member 35. The solenoid 36 is arranged in the main body housing 11 outside of the magazine 26.

As described above, the solenoid 36 for feeding the driving member n within the magazine 26 to the driving passage 2*a* in the driver guide 4 is arranged in the main body housing 11. Because of this configuration, the solenoid 36 can be arranged on the flow passage of the cooling air for cooling off, for example, the electric motor 20. Accordingly, the solenoid 36 can be efficiently cooled off, thereby suppressing a temperature rise of the solenoid 36. Furthermore, the arrangement of the power transmission member 35 between the solenoid 36 and the feed pawl 31 can efficiently transmit the output of the solenoid 36 to the feed pawl 31.

As shown in FIGS. 7 to 9, the power transmission member 35 is supported by the main body housing 11 such that the power transmission member 35 is rotatable around the rotation support 35*a* and coupled to the feed pawl 31 via the pawl coupling portion 35*c*. The plunger 36*a* of the solenoid 36 is coupled to the power transmission member 35 between the rotation support 35*a* and the pawl coupling portion 35*c*. In other words, a part of the power transmission member 35 is arranged between the plunger 36*a* of the solenoid 36 and the feed pawl 31. Also, the plunger 36*a* is coupled to the power transmission member 35 between the rotation support 35*a* and the pawl coupling portion 35*c*. Because of this configuration, a short stroke of the plunger 36*a* can move the feed pawl 31 by utilizing the principle of leverage. Also, a rapid movement of the feed pawl 31 can be obtained. Furthermore, the short stroke of the plunger 36*a* can make a length of the plunger 36*a* inserted into the coil 36*b* (refer to FIG. 13) to be maintained as long as possible even when the plunger 36*a* is most protruded (and retracted). Accordingly, the output of the solenoid 36 can be highly maintained.

As shown in FIGS. 7 to 9, the driving tool 1 includes the compression spring (biasing member) 32 for biasing the feed pawl 31 toward the driver guide 4. When the solenoid 36 is turned on, the feed pawl 31 moves in a direction opposite to the biasing direction of the compression spring 32. Accordingly, the feed pawl 31 is constantly biased on a side of the driver guide 4 (in a feeding direction) by the compression spring 32. The solenoid 36 is turned on only when the next driving member n is to be received by the feed pawl 31. Because of this configuration, a driving time of the solenoid 36 is made short and also the driving member n can be supplied to the driving passage 2*a* of the driver guide 4 one by one in a reliable manner.

As shown in FIGS. 2 and 7 to 9, the main body housing 11 includes the mechanism case (motor housing) 12 for housing the electric motor 20. The solenoid 36 is housed in the mechanism case 12 (motor housing) and also arranged between the electric motor 20 and the magazine 26. The solenoid 36 and the electric motor 20 are housed in the mechanism case (motor housing) 12, and accordingly both the solenoid 36 and the electric motor 20 can be cooled off by a cooling mechanism such as, for example, the fan 21. The magazine 26 is arranged with respect to the main body housing 11 in a position where the driving member n is supplied within the driver guide 4. Accordingly, a space is needed between the electric motor 20 and the magazine 26. The solenoid 36 can be arranged by utilizing the space, thereby making the driving tool 1 compact.

As shown in FIG. 2, the driving tool 1 includes the fan 21 for generating the air flow in the main body housing 11. The solenoid 36 is arranged in the air passage A1 in which the air flow generated by the fan 21 flows, thereby efficiently cooling off the solenoid 36 in an improved manner.

As shown in FIG. 2, the solenoid 36 is arranged on an upstream side of the air passage (air passage A1) with respect to the electric motor 20. Accordingly, the cooling air flow cools off the solenoid 36 at first and then the electric motor 20. A driving time of the electric motor 20 in the driving tool 1 is short because the electric motor 20 is activated only when the driver 16 moves to the standby position or to the top dead center. On the contrary, a quantity of heat generated in the coil 36*b* (refer to FIG. 13) is large though the driving time of the solenoid 36 is short. The solenoid 36, which generates a large quantity of heat, is cooled off at first, thereby efficiently cooling off the electric components including the solenoid 36 and the electric motor 20 in an improved manner.

As shown in FIG. 2, the main body housing 11 includes the mechanism case (motor housing) 12 that houses the electric motor 20. The mechanism case (motor housing) 12 includes the motor housing compartment 12*a* for housing the electric motor 20 and the solenoid housing compartment 12*b* for housing the solenoid 36. The motor housing compartment 12*a* communicates with the solenoid housing compartment 12*b* via the communication passage 12*g*. Because of this configuration, the air passage can be formed such that the cooling air flow for cooling off the electric motor 20 and the solenoid 36 passes through the communication passage 12*g*. Accordingly, the cooling air flow can be guided such that the electric motor 20 and the solenoid 36 are efficiently cooled off in an improved manner.

As shown in FIGS. 1 and 2, the main body housing 11 includes the inlet ports 12*e* in the second wall 12*d* facing the coin 36*c* of the solenoid 36 (refer to FIG. 3). In other words, the inlet ports 12*e* are formed such that the outside air taken from the inlet ports 12*e* easily flows to the coil 36*b* of the solenoid 36, thereby efficiently cooling off the solenoid 36 in an improved manner.

As shown in FIGS. 3, 5, and 6, the driving tool 1 includes the piston 15 connected to the driver 16. The driving tool 1 includes the cylinder 13 that is configured such that the piston 15 is movable within the cylinder 13. When the driver 16 moves in a direction opposite to the driving direction by the electric motor 20, the pressure of the gas in the cylinder 13 increases. Accordingly, in the so-called gas-spring type driving tool 1, the solenoid 36 for feeding the driving member n can be arranged in a position where the solenoid 36 is efficiently cooled off.

Next, a second embodiment of the present disclosure will be explained with reference to FIGS. 15 and 16. The main body housing 11 of a driving tool 50 in the second embodiment includes a mechanism case (motor housing) 51 instead of the mechanism case (motor housing) 12 shown in FIG. 1. In the following explanation, descriptions which are not in common with the first embodiment will be explained in detail. The mechanism case (motor housing) 51 is formed in approximately a tubular shape extending in the front-rear direction below the grip 5. The mechanism case (motor housing) 51 includes a motor housing compartment 51*a*, a gear housing compartment 51*h*, a lifter housing compartment 51*i*, a solenoid housing compartment 51*b*, and a communication passage 51*g*. These configurations are formed similar to the motor housing compartment 12*a*, the gear housing compartment 12*h*, the lifter housing compartment 12*i*, the solenoid housing compartment 12*b* and the communication passage 12*g* of the mechanism case 12 shown in FIG. 2.

Figure 15:
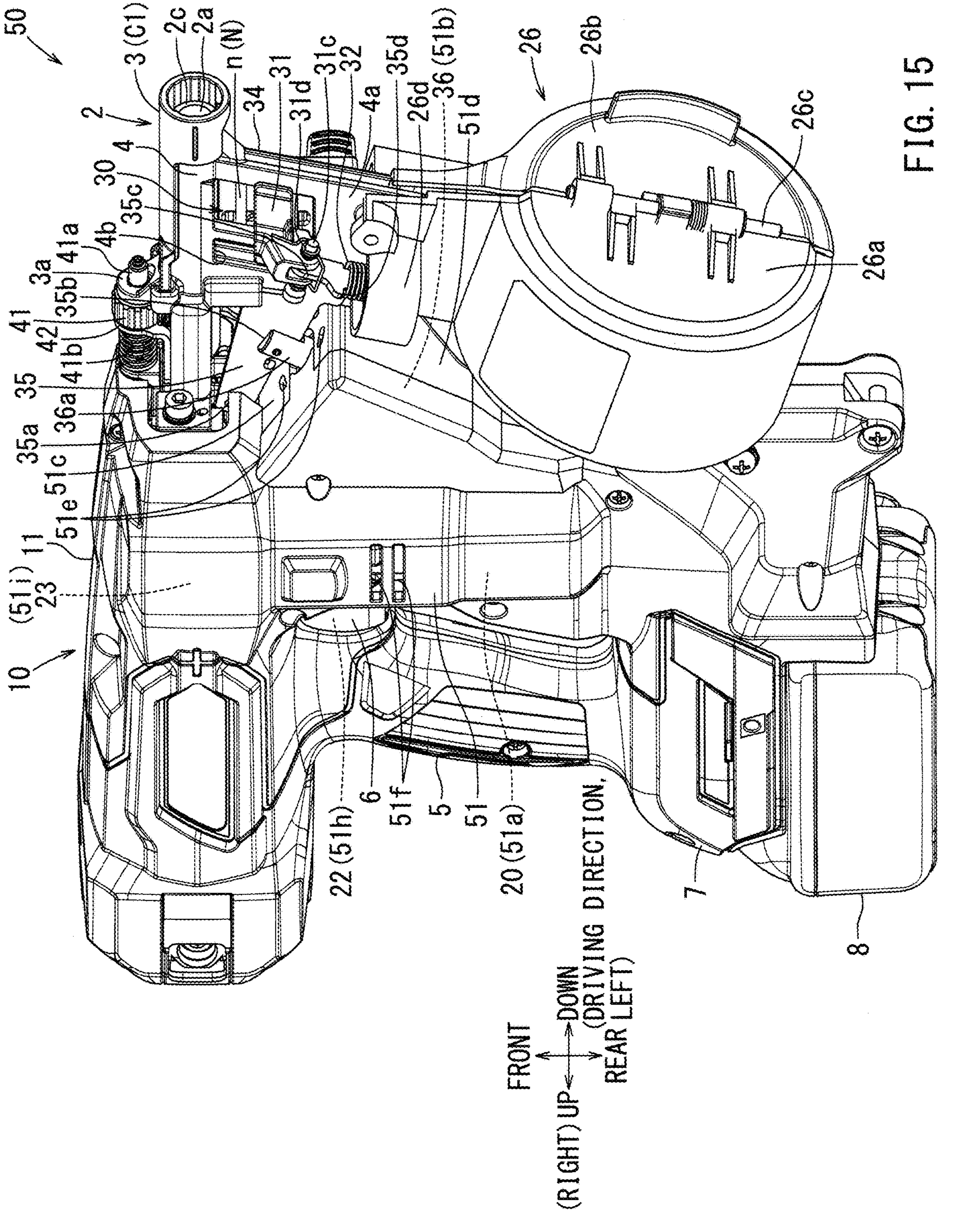
FIG. 15 is a perspective view of a driving tool according to a second embodiment of the present disclosure.
Figure 16:
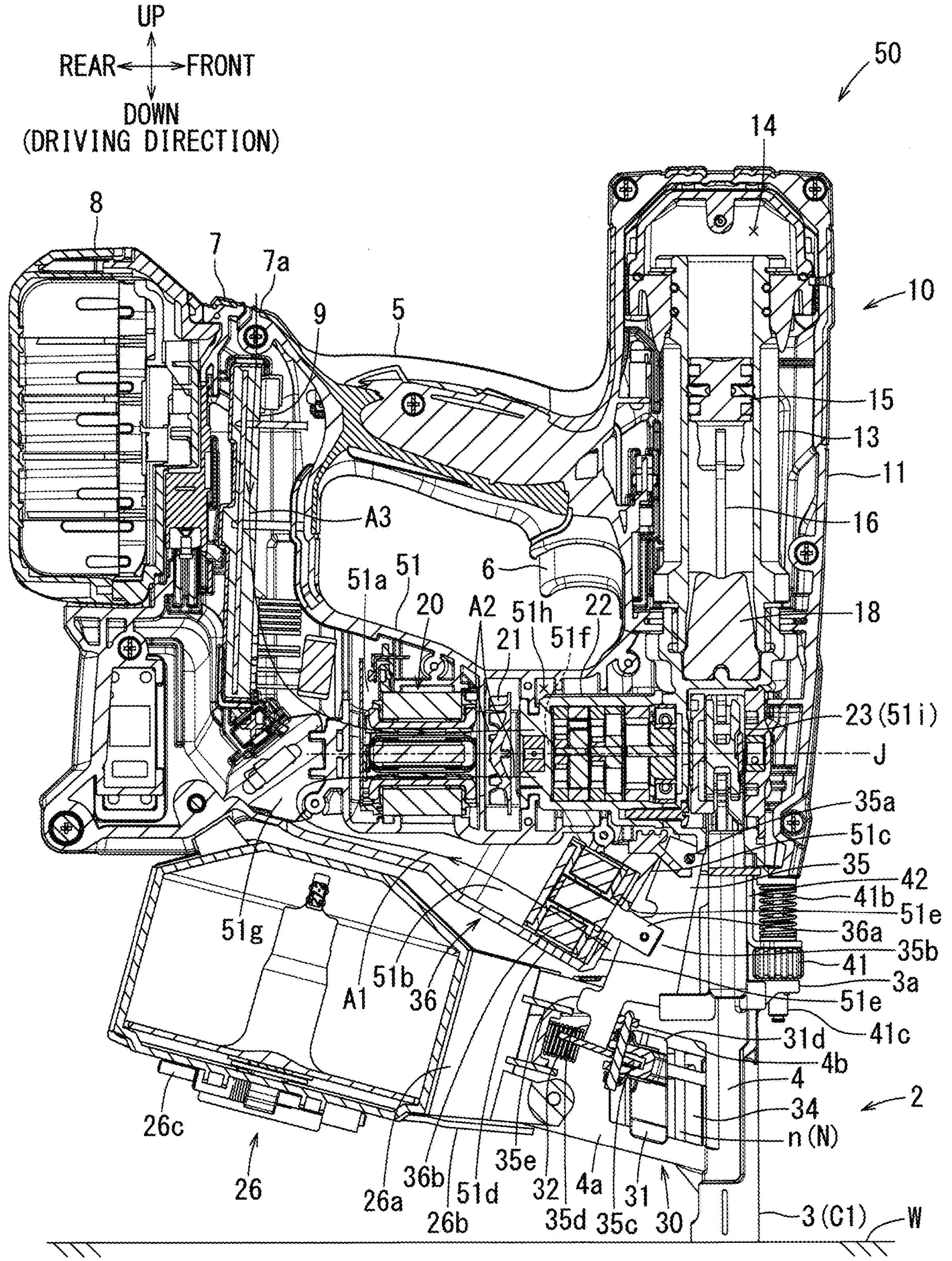
FIG. 16 is a cross-sectional view taken along line XVI-XVI of FIG. 5, showing the driving tool according to the second embodiment.

As shown in FIGS. 15 and 16, the solenoid 36 is housed in a front portion of the solenoid housing compartment 51*b* formed in an approximately rectangular box shape. The plunger 36*a* of the solenoid 36 is tilted downward with respect to the output axis line J as it extends in the forward direction. The solenoid housing compartment 51*b* includes a first wall 51*c* on a front side and a second wall 51*d* on a lower side. The first wall 51*c* faces the driving nose 2 and the second wall 51*d* faces the magazine 26. The plunger 36*a* protrudes from a middle of the first wall 51*c* to the outside of the solenoid housing compartment 51*b*. The first wall 51*c* includes inlet ports 51*e* around the plunger 36*a* which pass through the inside and the outside of the solenoid housing compartment 51*b*. The inlet ports 51*e* are aligned with the solenoid 36 approximately in the front-rear direction. The exhaust ports 51*f* passing through the inside and the outside of the gear housing compartment 51*h* are formed on both the left and right sides of the gear housing compartment 51*h*.

A cooling air flow for cooling off the solenoid 36 will be explained with reference to FIG. 2. When the electric motor 20 is activated, the fan 21 rotates integrally with the output shaft 20*a*. Accordingly, a cooling air flow flowing from the rear to the front in the motor housing compartment 51*a* of the mechanism case 51 is generated. A negative pressure is generated inside of the solenoid housing compartment 51*b*, which communicates with the motor housing compartment 51*a* via the communication passage 51*g*, thereby flowing the cooling air inside of the solenoid housing compartment 51*b*. An outside air as the cooling air is taken into the solenoid housing compartment 51*b* from the inlet ports 51*e* of the first wall 51*c* at first. The cooling air flows in an air passage A1, passing through between the coil 36*b* of the solenoid 36*b* and an inner circumferential surface of the holder 36*c*, and flowing rearward to the communication passage 51*g*. The cooling air flowing in the air passage A1 cools off the coil 36*b*. After that, the cooling air flows in an air passage A2 from the communication passage 51*g* to the motor housing compartment 51*a* in the forward direction. The cooling air flowing in the air passage A2 cools off the electric motor 20. The cooling air is discharged to the outside from the exhaust ports 51*f* in the gear housing compartment 51*h*.

As shown in FIGS. 15 and 16, the main body housing 11 includes the inlet ports 51*e* in the first wall 51*c* through which the plunger 36*a* of the solenoid 36 passes. In other words, the inlet ports 51*e* are formed such that the outside air taken from the inlet ports 51*e* easily flows to the coil 36*b* of the solenoid 36, thereby efficiently cooling off the solenoid 36 in an improved manner.

Next, a third embodiment of the present disclosure will be explained with reference to FIG. 17. The main body housing 11 of a driving tool 60 in the third embodiment includes a mechanism case (motor housing) 61 instead of the mechanism case (motor housing) 12 shown in FIG. 1. In the following explanation, descriptions which are not in common with the first embodiment will be explained in detail. The mechanism case (motor housing) 61 is formed in approximately a tubular shape extending in the front-rear direction below the grip 5. The mechanism case (motor housing) 61 includes a motor housing compartment 61*a*, a gear housing compartment 61*i*, a lifter housing compartment 61*j*, a solenoid housing compartment 61*b*, and a communication passage 51*g*. These configurations are formed similar to the motor housing compartment 12*a*, the gear housing compartment 12*h*, the lifter housing compartment 12*i*, the solenoid housing compartment 12*b* and the communication passage 12*g* of the mechanism case 12 shown in FIG. 2.

Figure 17:
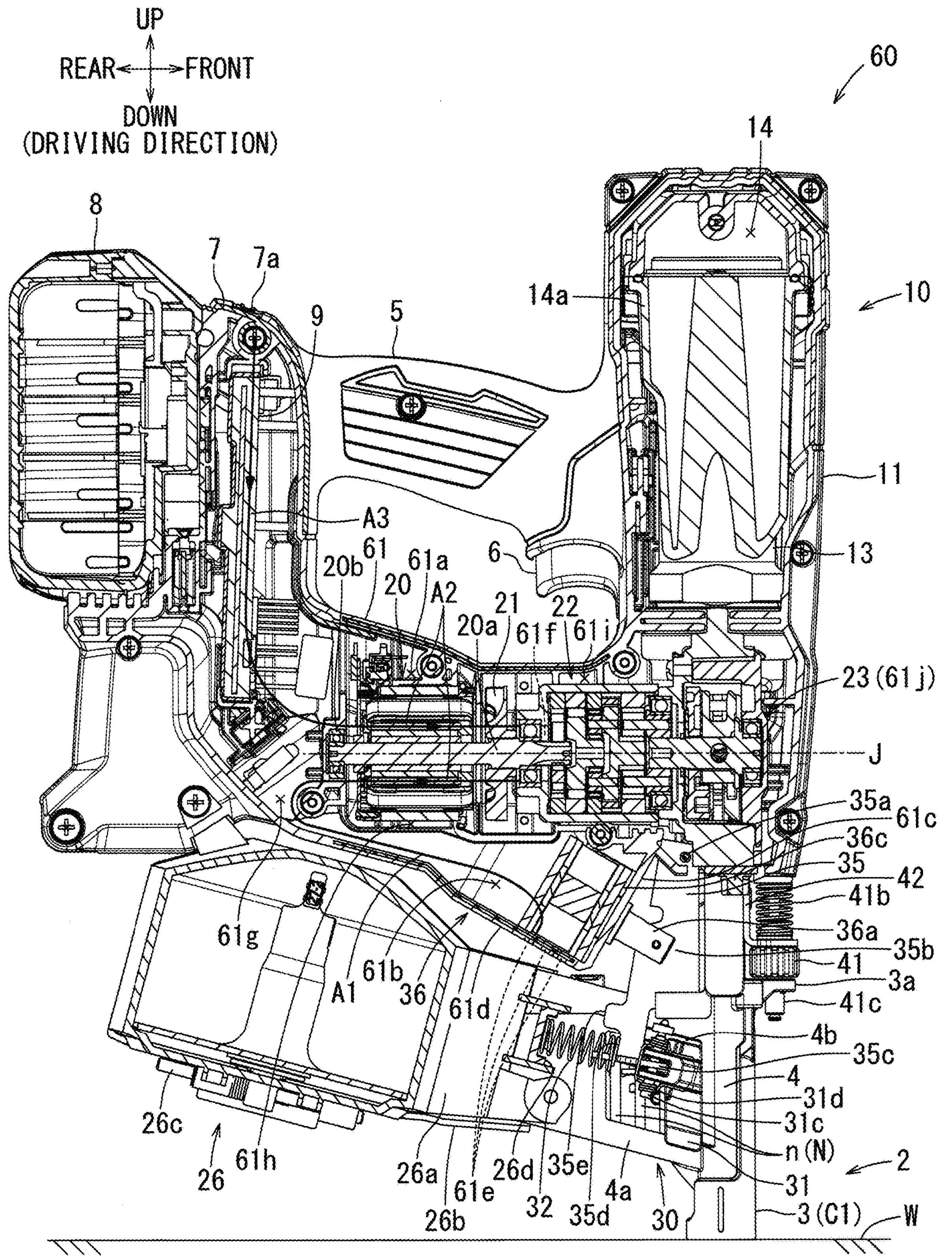
FIG. 17 is a cross-sectional view taken along line XVII-XVII of FIG. 5, showing a driving tool according to a third embodiment of the present disclosure.

As shown in FIG. 17, the solenoid 36 is housed in a front end of the solenoid housing compartment 61*b* formed in an approximately rectangular box shape. The plunger 36*a* of the solenoid 36 is tilted downward with respect to the output axis line J as it extends in the forward direction. The solenoid housing compartment 61*b* includes a first wall 61*c* on a front side and a second wall 61*d* on a lower side. The first wall 61*c* faces the driving nose 2 and the second wall 61*d* faces the magazine 26. The plunger 36*a* protrudes from a middle of the first wall 61*c* to the outside of the solenoid housing compartment 61*b*. The second wall 61*d* includes inlet ports 61*e* which pass through the inside and the outside of the solenoid housing compartment 61*b*. The inlet ports 61*e* are aligned with the solenoid 36 approximately in the up-down direction. The exhaust ports 61*f* passing through the inside and the outside of the gear housing compartment 61*i* are formed on both the left and right sides of the gear housing compartment 61*i*.

As shown in FIG. 17, a rear portion of the solenoid housing compartment 61*b* communicates with a rear portion of the motor housing compartment 61*a* via the communication passage 61*g*. An exposed portion 61*h* which exposes an outer surface of a stator of the electric motor 20 to a rear portion of the solenoid housing compartment 61*b* is formed on a right half area of the lower surface of the motor housing compartment 61*a*. A cooling air is taken from the inlet ports 61*e* and enters the solenoid housing compartment 61*b*. After passing through the adjoining area of the coil 36*b*, the cooling air passes through a first air passage A1 which is directed to the communication passage 61*g* in the rearward direction. At this time, the cooling air cools off an outer surface of the stator of the electric motor 20 via the exposed portion 61*h*. After that, the cooling air passes through a second air passage A2 which is directed from the communication passage 61*g* toward the motor housing compartment 61*a* in the forward direction. At this time, the cooling air passes through the inside of the electric motor 20 to cool off an inner surface of the stator and a rotor of the electric motor 20. The cooling air passing through the second air passage A2 is discharged to the outside from the exhaust ports 61*f* of the gear housing compartment 61*i*.

As described above, the air passage includes the first air passage A1 and the second air passage A2. As shown in FIG. 17, the cooling air in the first air passage A1 cools off the electric motor 20 from outside. The cooling air in the second air passage A2, which is connected to the first air passage A1, passes through the inside of the electric motor 20. Accordingly, the electric motor 20 is cooled off both from the outside and the inside, thereby efficiently cooling off the electric motor 20.

Next, a fourth embodiment of the present disclosure will be explained with reference to FIGS. 18 and 19. The main body housing 11 of a driving tool 70 in the fourth embodiment includes a mechanism case (motor housing) 73 instead of the mechanism case (motor housing) 12 shown in FIG. 1. In addition to the electric motor 20, a sub-motor 71 for cooling off is arranged in a mechanism case (motor housing) 73. In the following explanation, descriptions which are not in common with the first embodiment will be explained in detail. The mechanism case (motor housing) 73 is formed in approximately a tubular shape extending in the front-rear direction below the grip 5. The mechanism case 73 includes a motor housing compartment 73*a*, a gear housing compartment 73*j*, and a lifter housing compartment 73*k*. These configurations are formed similar to the motor housing compartment 12*a*, the gear housing compartment 12*h*, and the lifter housing compartment 12*i* shown in FIG. 2.

Figure 18:
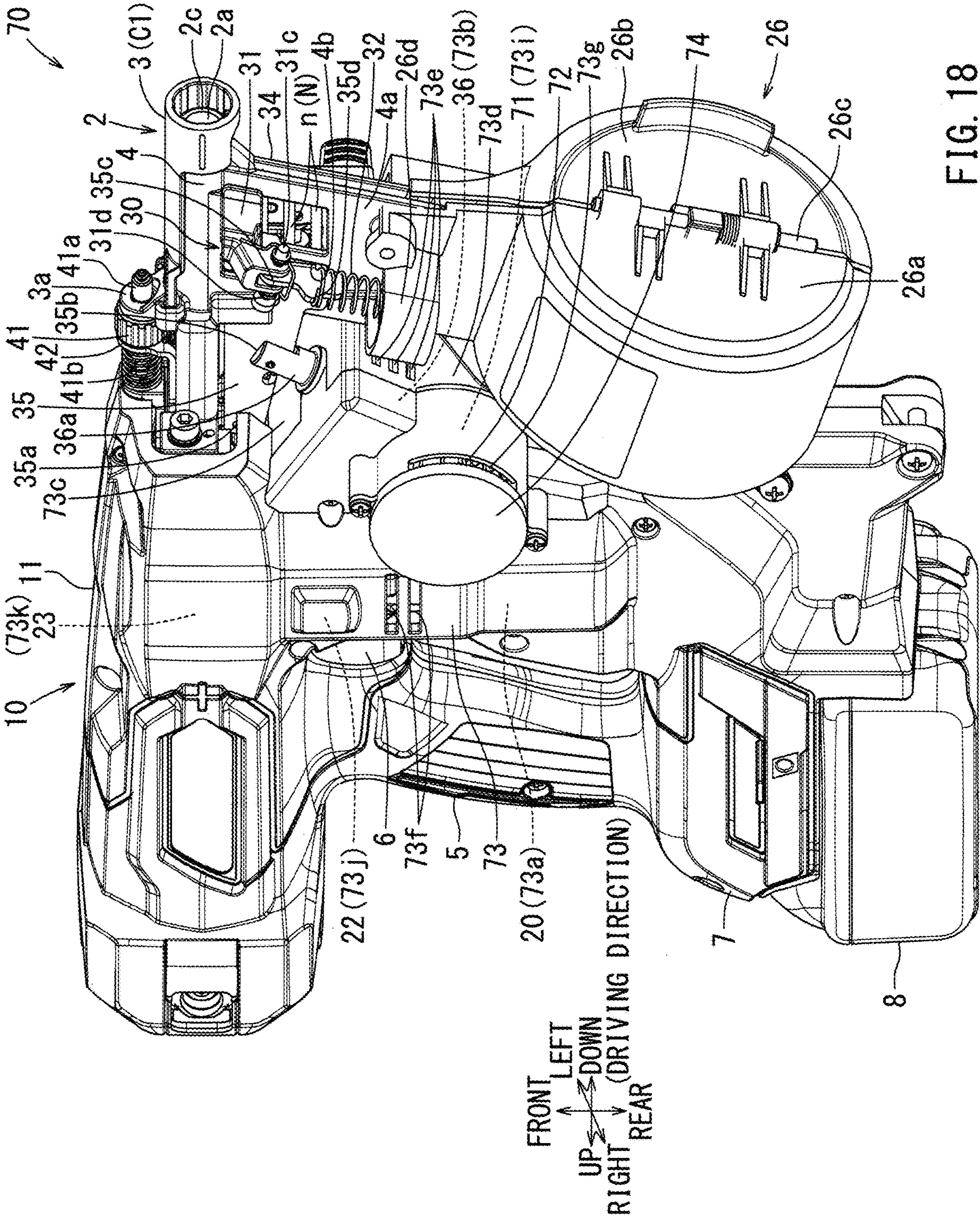
FIG. 18 is a perspective view of a driving tool according to a fourth embodiment of the present disclosure.
Figure 19:
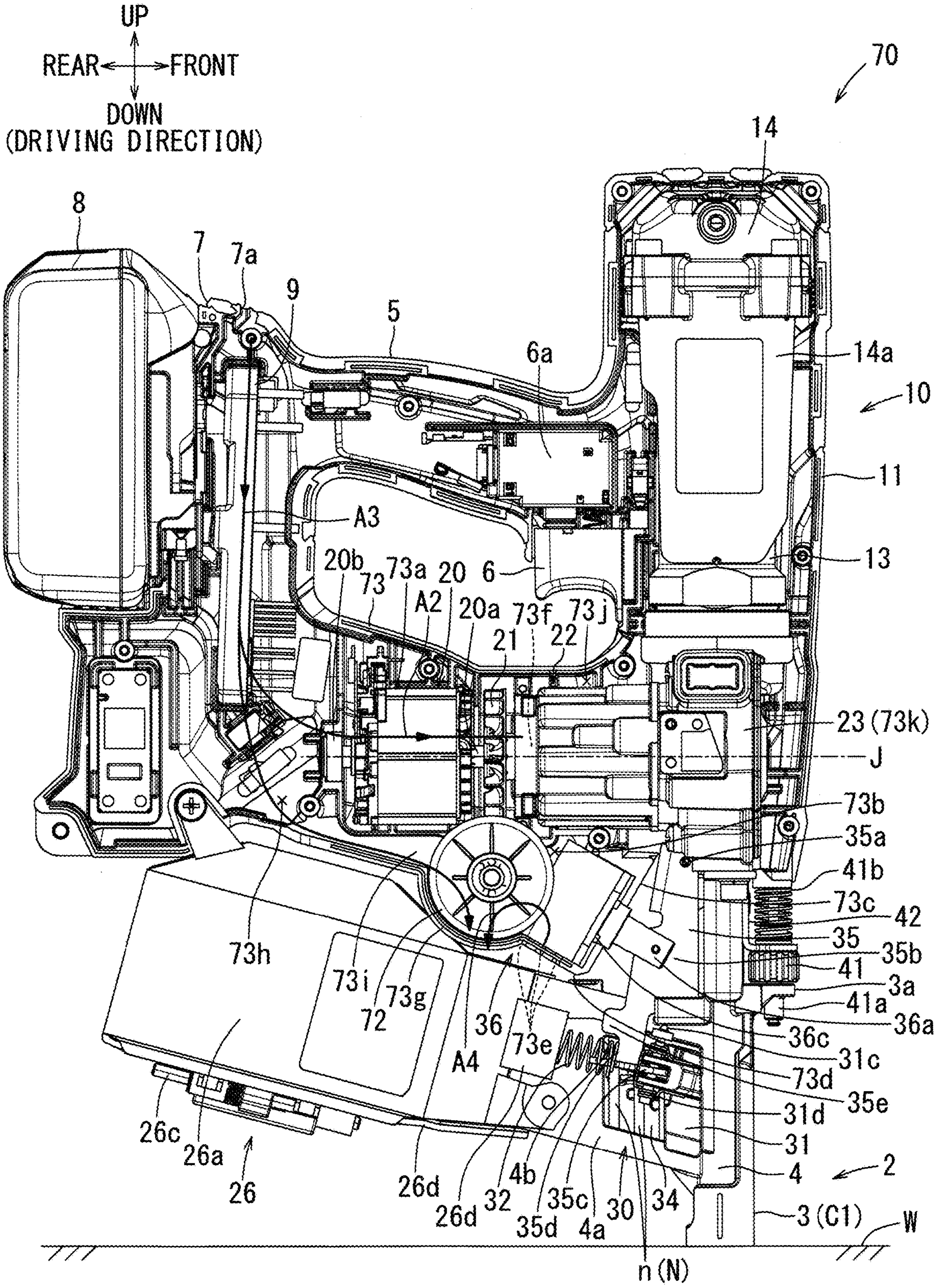
FIG. 19 is a right side view of the driving tool without a right housing according to the fourth embodiment.

As shown in FIGS. 18 and 19, the mechanism case (motor housing) 73 includes the motor housing compartment 73*a* and the solenoid housing compartment 73*b* below the gear housing compartment 73*j*. The solenoid 36 is housed in the solenoid housing compartment 73*b*. Also, the mechanism case (motor housing) 73 includes a sub-motor housing compartment 73*i* below the motor housing compartment 73*a* and the gear housing compartment 73*j* and behind the solenoid housing compartment 73*b*. The sub-motor 71 is housed in the sub-motor housing compartment 73*i*.

As shown in FIG. 19, the sub-motor housing compartment 73*i* communicates with the solenoid housing compartment 73*b* with each other. The solenoid housing compartment 73*b* and the sub-motor housing compartment 73*i* are partitioned from the motor housing compartment 73*a* and the gear housing compartment 73*j* by a lower surface of the motor housing compartment 73*a* and a lower surface of the gear housing compartment 73*j*. A rear portion of the solenoid housing compartment 73*b* communicates with the sub-motor housing compartment 73*i*, and communicates with the motor housing compartment 73*a* via a communication passage 73*h* formed in a rear portion of the motor housing compartment 73*a*. Furthermore, a lower portion of the battery attachment portion 7 communicates with the motor housing compartment 73*a* and the sub-motor housing 73*a* via the communication passage 73*h*. The motor housing compartment 73*a* communicates with the gear housing compartment 73*j* in the front-rear direction.

As shown in FIGS. 18 and 19, the solenoid 36 is housed in a front portion of the solenoid housing compartment 73*b* formed in an approximately rectangular box shape. The plunger 36*a* of the solenoid 36 is tilted downward with respect to the output axis line J as it extends in the forward direction. The solenoid housing compartment 73*b* includes a first wall 73*c* on a front side and a second wall 73*d* on a lower side. The first wall 73*c* faces the driving nose 2 and the second wall 73*d* faces the magazine 26. The plunger 36*a* protrudes from a middle of the first wall 73*c* to the outside of the solenoid housing compartment 73*b*. The second wall 73*d* includes inlet ports 73*e* which pass through the inside and the outside of the solenoid housing compartment 73*b*. The inlet ports 73*e* are aligned with the solenoid 36 approximately in the up-down direction. The exhaust ports 73*f* passing through the inside and the outside of the gear housing compartment 73*j* are formed on both the left and right sides of the gear housing compartment 73*j*.

As shown in FIGS. 18 and 19, the sub-motor housing compartment 73*i* is formed in approximately a cylindrical shape. An axial direction of the sub-motor housing compartment 73*i* is the left-right direction. An output shaft of the sub-motor 71 extends in the left-right direction, i.e., approximately perpendicular to the output axis line J. A fan 72 is attached to a right end of the output shaft of the sub-motor 71. A disc-shaped cover 74 for covering a right side of the fan 72 is attached to a right end of the sub-motor housing compartment 73*i*. Second exhaust ports 73*g* is formed between the sub-motor housing compartment 73*i* and the cover 74. The second exhaust ports 73*g* are arranged radially outside of a lower area of the fan 72. Exhaust of the air is performed through the second exhaust ports 73*g* in the downward direction.

A cooling air flow flowing in the main body housing 11 will be explained with reference to FIG. 19. When the electric motor 20 is activated, the fan 21 rotates integrally with the output shaft 20*a*, generating a cooling air flow flowing from the rear to the front in the motor housing compartment 73*a* of the mechanism case 73. A negative pressure is generated inside of the battery attachment portion 7 by rotation of the fan 21. When the sub-motor 71 is activated, the fan 72 rotates integrally with the output shaft of the sub-motor 71 and generates a cooling air flow flowing from the left to the right within the sub-motor housing compartment 73*i* of the mechanism case 73. A negative pressure is generated inside of the solenoid housing compartment 73*b* and the battery attachment portion 7 by rotation of the fan 72, and accordingly a cooling air flow flows through the solenoid housing compartment 73*b* and the battery attachment portion 7. The sub-motor 71 is configured to rotate independently from the electric motor 20. A timing of activation of the sub-motor 71 can be arbitrary set. For example, power may be supplied to the sub-motor 71 when the trigger 7 is pull-operated. Instead, for example, power may be supplied to the sub-motor 71 when a movement of the contact arm 3 to the upper position C2 (refer to FIG. 6) is detected. Instead, for example, power supply to the sub-motor 71 may be such that power is shut down when a predetermined time is passed after power supply starts.

An outside air as the cooling air is taken into the solenoid housing compartment 73*b* from the inlet ports 73*e* of the second wall 73*d* at first. The cooling air passes through between the coil 36*b* of the solenoid 36 (refer to FIG. 13) and the inner circumferential surface of the holder 36*c* to cool off the coil 36*b*. The cooling air passes through an air passage A4 that is directed from the rearward sub-motor housing compartment 73*i* to the fan 72. The cooling air flowing through the air passage A4 is discharged from the second exhaust ports 73*f* to the outside by rotation of the fan 72.

An outside air as the cooling air is taken into the battery attachment portion 7 from the inlet ports 7*a* at the upper end of the battery attachment portion 7 at first. The cooling air passes through the adjoining area of the controller 9 and also passes through an air passage A3 directed to the communication passage 73*h* below the controller 9. The cooling air passing through the air passage A3 cools off the controller 9. The cooling air passing through the air passage A3 flows from the communication passage 73*h* to the sub-motor housing compartment 73*i*. The cooling air flowing to the sub-motor housing compartment 73*i* is discharged from the second exhaust ports 73*f* to the outside by rotation of the fan 72. Also, a part of the cooling air passing through the air passage A3 branches in the communication passage 73*h* and is directed to the air passage A2 for flowing to the motor housing compartment 73*a*. The cooling air passing through the air passage A2 cools off the electric motor 20. The cooling air is discharged from the first exhaust ports of the gear housing compartment 73*j* to the outside.

The driving tools 1, 50, 60, and 70 according to the above-described embodiments may be modified in various ways. In the above embodiments, the gas-spring type driving tool is exemplified. Instead, the present disclosure may be applied to a mechanical-spring type driving tool in which the driver is driven by utilizing a spring force by a mechanical compression spring which is generated when the driver moves in a direction opposite to the driving direction by the lift mechanism. Instead, for example, the present disclosure may be applied to a flywheel type driving tool in which the driver is driven by utilizing an inertia force of a flywheel. Instead, for example, the present disclosure may be applied to an electric-pneumatic type driving tool in which the driver is driven by utilizing a compression air generated by rotation of a crank owing to an electric motor.

In the above-exemplified embodiments, a ratio of distance between the rotation support 35*a* and the pawl coupling portion 35*c* to distance between the rotation support 35*a* and the plunger coupling portion 35*b*, which is referred to as a lever ration, is two. Instead, the ratio may be modified as needed. For example, when it is desirable to shorten a moving distance of the plunger 36*a* with the output of the solenoid 36 increased, or when it is desirable to shorten a drive time of the feed mechanism 30, the lever ratio may be increased. Instead, for example, when it is desirable to reduce the output of the solenoid 36, the lever ratio may be decreased.

For example, the mechanism case 51 of the second embodiment may include the exposed portion 61*h* in the third embodiment by which the electric motor 20 is cooled of from outside. For example, the mechanism case 51 of the second embodiment may include the sub-motor housing compartment 73*i* in the fourth embodiment which houses the sub-motor 71 having the fan 72. For example, in the fourth embodiment, it may be configured such that the fan 21 is removed from the output shaft 20*a* and only the fan 72 of the sub-motor 71 cools off the electric motor 20, the solenoid 36, and the controller 9.

In the first embodiment, the second wall 12*d* includes inlet ports 12*e*. Instead, it may be configured such that the first wall 12*c* also includes the inlet ports.

We claim:

1. A driving tool comprising:
an electric motor;
a driver configured to be moved by the electric motor in a direction opposite to a driving direction;
a driver guide configured to guide a movement of the driver;
a magazine for housing a plurality of driving members;
a feed pawl for loading the plurality of driving members from the magazine to the driver guide one by one;
a power transmission member being interlocking with a movement of the feed pawl; and
a solenoid configured to move the feed pawl via the power transmission member, the solenoid being arranged in a main body housing outside of the magazine,
wherein:
the power transmission member is supported by the main body housing such that the power transmission member is rotatable around a rotation support, the power transmission member being coupled to the feed pawl via a pawl coupling portion, and
a plunger of the solenoid is connected to the power transmission member between the rotation support and the pawl coupling portion.

2. The driving tool according to claim 1, further comprising a biasing member configured to bias the feed pawl toward the driver guide,
wherein the feed pawl is movable by the solenoid in a direction opposite to a biasing direction of the biasing member when the solenoid is turned on.

3. The driving tool according to claim 1, wherein,
the main body housing includes a motor housing for housing the electric motor, and
the solenoid is arranged in the motor housing between the electric motor and the magazine.

4. The driving tool according to claim 1, further comprising a fan to generate a cooling air flow passing a plurality of air passages in the main body housing,
wherein the solenoid is arranged in one of the plurality of air passages.

5. The driving tool according to claim 4, wherein the solenoid is arranged on an upstream side of the one of the plurality of air passages with respect to the electric motor.

6. The driving tool according to claim 4, wherein the main body housing includes an inlet port arranged either in a first wall for the plunger of the solenoid passes through or in a second wall facing a coil of the solenoid.

7. The driving tool according to claim 6, wherein the plurality of air passages includes a first air passage for the cooling air flow from the inlet port passing through to cool off (i) the solenoid, or (ii) both the solenoid and the outside of the electric motor, and a second air passage for the cooling air flow from the inlet port passing through to cool off inside of the electric motor, the first air passage communicating with the second air passage, and wherein the first air passage is the one of the plurality of air passages.

8. The driving tool according to claim 7, wherein, the main body housing includes a motor housing for housing the electric motor, the motor housing includes a motor housing compartment for housing the electric motor and a solenoid housing compartment for housing the solenoid, the motor housing compartment communicating with the solenoid housing compartment via a communication passage, and the motor housing compartment includes an exposed portion configured to expose an outer surface of a stator of the electric motor.

9. The driving tool according to claim 7, wherein, the main body housing includes a second inlet port in an adjoining area of a controller for controlling an operation of the driving tool, and the plurality of air passages further includes a third air passage for the cooling air flow from the second inlet port to cool the controller.

10. The driving tool according to claim 9, wherein the third air passage merges into the second air passage.

11. The driving tool according to claim 4, wherein the fan is attached to an output shaft of the electric motor.

12. The driving tool according to claim 1, further comprising:

a piston connected to the driver; and a cylinder configured such that the piston is movable within the cylinder, wherein a pressure of a gas in the cylinder increases by a movement of the driver in the direction opposite to the driving direction.

13. The driving tool according to claim 1, wherein, the plunger of the solenoid is connected to the power transmission member at a plunger coupling portion disposed in the power transmission member, and a ratio of distance between the rotation support and the pawl coupling portion to distance between the rotation support and the plunger coupling portion is approximately two.

14. The driving tool according to claim 1, wherein, the plunger of the solenoid is connected to the power transmission member at a plunger coupling portion disposed in the power transmission member, and a ratio of distance between the rotation support and the pawl coupling portion to distance between the rotation support and the plunger coupling portion is less than two.

15. A driving tool comprising:

an electric motor:

a driver configured to be moved by the electric motor in a direction opposite to a driving direction:

a driver guide configured to quide a movement of the driver;

a magazine for housing a plurality of driving members:

a feed pawl for loading the plurality of driving members from the magazine to the driver guide one by one;

a power transmission member being interlocking with a movement of the feed pawl:

a solenoid configured to move the feed pawl via the power transmission member, the solenoid being arranged m a main body housing outside of the magazine; and a fan to generate a cooling air flow passing through a plurality of air passages in the main body housing wherein:

the solenoid is arranged in one of the plurality of air passages, the main body housing includes a motor housing for housing the electric motor, and the motor housing includes a motor housing compartment for housing the electric motor and a solenoid housing compartment for housing the solenoid, the motor housing compartment communicating with the solenoid housing compartment via a communication passage.

16. The driving tool according to claim 15, further comprising a sub-motor, wherein the motor housing further includes a sub-motor housing compartment for housing the sub-motor, the sub-motor housing compartment being arranged below the motor housing compartment and behind the solenoid housing compartment.

17. The driving tool according to claim 16, wherein a second fan is attached to an output shaft of the sub-motor.

18. The driving tool according to claim 17, wherein, the main body housing includes an inlet port either in a first wall for the plunger of the solenoid passes through or in a second wall facing a coil of the solenoid, and the plurality of air passages includes a fourth air passage for the cooling air flow from the inlet port to cool off the solenoid.

* * * * *